US006817232B2

(12) United States Patent
Amano et al.

(10) Patent No.: US 6,817,232 B2
(45) Date of Patent: Nov. 16, 2004

(54) FAILURE DIAGNOSIS METHOD AND FAILURE DIAGNOSIS DEVICE OF EVAPORATED FUEL TREATING UNIT

(75) Inventors: Noriyasu Amano, Gamagori (JP); Hideaki Itakura, Nagoya (JP); Naoya Kato, Ama-gun (JP); Masao Kano, Gamagori (JP)

(73) Assignees: Nippon Soken, Inc., Nishio (JP); Denso Corporation, Kariya (JP)

(*) Notice: Subject to any disclaimer, the term of this patent is extended or adjusted under 35 U.S.C. 154(b) by 0 days.

(21) Appl. No.: 10/408,100

(22) Filed: Apr. 8, 2003

(65) Prior Publication Data

US 2003/0192370 A1 Oct. 16, 2003

(30) Foreign Application Priority Data

Apr. 11, 2002 (JP) ....................................... 2002-109172
Jan. 31, 2003 (JP) ....................................... 2003-024353

(51) Int. Cl.[7] ............................................... G01M 15/00
(52) U.S. Cl. ....................................... 73/118.1; 73/49.7
(58) Field of Search ................................ 73/40, 46, 47, 73/49.7, 112, 115, 116, 117.2, 117.3, 118.1, 119 R

(56) References Cited

U.S. PATENT DOCUMENTS 5,146,902 A 9/1992 Cook et al.
5,575,265 A 11/1996 Kurihara et al.
5,890,474 A 4/1999 Schnaibel et al.
6,164,123 A * 12/2000 Corkill ....................... 73/49.7
6,257,050 B1 * 7/2001 Nagano et al. ................ 73/47
6,308,119 B1 * 10/2001 Majkowski et al. .......... 701/29
6,382,017 B1 * 5/2002 Majkowski et al. ......... 73/49.7
6,640,620 B2 * 11/2003 Cook et al. ................ 73/118.1
6,666,072 B2 * 12/2003 Hirano et al. ................ 73/49.7
6,738,709 B2 * 5/2004 Saito et al. ................. 701/114
2001/0008136 A1 * 7/2001 Kitamura et al. ........... 123/516
2002/0026826 A1 * 3/2002 Cook et al. ................ 73/118.1
2002/0129643 A1 * 9/2002 Yamaguchi et al. ......... 73/49.7
2002/0189328 A1 * 12/2002 Saito et al. .................. 73/49.7
2003/0061871 A1 * 4/2003 Oki et al. .................. 73/118.1
2003/0084711 A1 * 5/2003 Kano et al. ............... 73/118.1
2003/0110836 A1 * 6/2003 Cho .......................... 73/40.7
2003/0154770 A1 * 8/2003 Steckler et al. .............. 73/49.7
2003/0172912 A1 * 9/2003 Kanai et al. ................ 123/520
2003/0196482 A1 * 10/2003 Kanai et al. ............... 73/118.1

FOREIGN PATENT DOCUMENTS

JP 11-351078 12/1999

* cited by examiner

*Primary Examiner*—Eric S. McCall
(74) *Attorney, Agent, or Firm*—Nixon & Vanderhye P.C.

(57) ABSTRACT

An apparatus detects leak in a fuel vapor treatment system which is referred to as an evaporation system. The apparatus measures a required time T2 that is required for decreasing pressure in the evaporation system from P0 to P1 while opening a base leak hole that provides known amount of leak. Then, a required time T1 that is required for decreasing pressure from P0 to P1 is measured while closing the base leak hole. The apparatus compares the required times T1 and T2 in order to detect a leak other than the base leak hole. In this process, a specified coefficient that is defined in accordance with the base leak hole is taken into consideration. It is possible to detect the leak of the evaporation system with high accuracy even when the amount of remaining fuel is extremely large.

10 Claims, 18 Drawing Sheets

FAILURE DIAGNOSIS METHOD AND FAILURE DIAGNOSIS DEVICE OF EVAPORATED FUEL TREATING UNIT

CROSS REFERENCE TO RELATED APPLICATIONS

This application is based on Japanese Patent Applications No. 2002-109172 filed on Apr. 11, 2002 and No. 2003-24353 filed on Jan. 31, 2003 the contents of which are incorporated herein by reference.

BACKGROUND OF THE INVENTION

1. Field of the Invention

The present invention relates to a failure diagnosis method and failure diagnosis device for an evaporated fuel treating unit and in particular, to a technology for making a determination on the leak of fuel vapor.

2. Description of Related Art

The evaporated fuel treating unit is a unit for preventing evaporated fuel produced in a fuel tank from being discharged into the atmosphere. A combined body of structural members including the fuel tank, a canister, a purge passage, and a purge control valve forms a closed space when the foregoing purge control valve is closed. This closed space is called an evaporation system. It is desired to mount a failure diagnosis device for determining whether or not evaporated fuel leaks from the evaporation system. Hereinafter, the failure diagnosis device and it's function may be referred to as leak check.

JP-A-5-272417, and U.S. Pat. No. 5,146,902 discloses a method in which pressure in the evaporation system is increased by a pump and then the state of decrease in the pressure in the evaporation system is measured at a specified time set previously to determine the state of leak. However, according to this method, the volume of a space to be pressurized is varied by the amount of remaining fuel and hence the rate of decrease in the pressure is also varied, so that it is possible to detect whether or not leak occurs but impossible to correctly detect the magnitude of the leak. Further, since the state of decrease in the pressure is varied also by differences in the atmospheric temperature and the properties of the fuel, it is impossible to determine the state of the leak sufficiently correctly if no correction is made. For example, the atmospheric temperature and the properties of the fuel affect the amount of evaporated fuel at a certain temperature. In order to grasp the state of the leak correctly, it is thought to correct the state of the leak by parameters affecting the determination such as the amount of remaining fuel but this makes the determination complex and hence increases cost. On the other hand, if stricter conditions for allowing the leak check are become stricter, it is impossible to achieve an essential object of ensuring the frequency of determinations.

On the other hand, JP-A-10-90107 discloses a method in which a pump is driven until operating characteristic values such as current, voltage, the number of revolutions are saturated and the saturated operating characteristic values are compared with the base values to determine the state of leak. However, according to this method, the pump is driven until the operating characteristic values are saturated and hence time to drive a pump is elongated, which degrades fuel consumption. Moreover, it is necessary to use a long-life pump or to increase the frequency of replacements of the pump and hence to increase cost.

Still further, JP-A-11-351078 discloses a method of using a base orifice. Variations in pressure in the evaporation system in this technology are shown in FIG. 19. The state of decrease in the pressure in the evaporation system from the time when the pressure is increased to a specified pressure P0 to the time when a previously set time T elapses is measured in a case where leak occurs at an orifice as a base leak point and in a case where leak does not occur. The pressure changing state may be measured as pressure differences P1, and P2. The amount of change in the pressure P2 caused by a leak hole as a failure is compared with the amount of change in the pressure P3=P1−P2 caused by the orifice as the base leak hole thereby to cancel effects produced by the amount of remaining fuel, atmospheric temperature, fuel properties, and the like.

However, in this method, when the amount of remaining fuel is extremely large, that is, the volume of the space to be pressurized is extremely small, as shown in FIG. 20, the rate of decrease in the pressure is increased to make the pressure zero, atmospheric pressure, that is equal to the pressure outside the evaporation system before the foregoing time T elapses. This is not the proper amount of change in pressure. On the other hand, when the amount of remaining fuel is small, the rate of decrease in the pressure is decreased to make it impossible to produce the sufficient amounts of change in pressure P1, P2 and hence to produce a sufficient detection accuracy. For this reason, there is a fear that correct determination can not be made on the state of leak. If the pressure in the evaporation system is sufficiently increased, the state of leak can be correctly determined but there are raised a problem that a fuel tank and the like need to have sufficient resistance to pressure and a problem that the capacity of a pump for increasing pressure needs to be increased. These problems can not be easily solved.

Still further, JP-A-11-351078 discloses a method of measuring time required for the pressure in the evaporation system to decrease by a specified amount of pressure drop. The measurement of time can be easily performed with higher accuracy than the detection of pressure. However, the determination method based on the amount of changes in the pressure P1, P2 can not be used for the determination based on the required time. For this reason, in order to put the method of leak check utilizing the required time into practical use, some improvements need to be made that are not disclosed in JP-A-11-351078.

The present invention has been made in view of the above circumstances. It is the object of the invention to provide a failure diagnosis method and a failure diagnosis device of an evaporated fuel treating unit by which a correct leak check can be performed regardless of the amount of remaining fuel and practically.

SUMMARY OF THE INVENTION

In accordance with the first aspect of the invention, there is provided a failure diagnosis method for diagnosing an evaporated fuel treating unit, which comprises the steps of: producing a pressure difference between inside an evaporation system having a fuel tank, the canister, the purge passage and the purge control valve and outside the evaporation system; measuring the state of change in pressure in the evaporation system; and determining the state of leak in the evaporation system based on the measured state of change in pressure.

In the method: a pressure in the evaporation system is made a first specified pressure, then a base leak hole is opened, and a first required time is measured that is required for the pressure in the evaporation system to change from the first specified pressure to a second specified pressure set at a value closer to a pressure outside the evaporation system in a state where leak occurs at the base leak hole and a leak hole as a failure;

the pressure in the evaporation system is made the first specified pressure, then the base leak hole is closed, and a second required time is measured that is required for the pressure in the evaporation system to change from the first specified pressure to the second specified pressure in a state where leak occurs only at the leak hole as a failure; and the state of the leak in the evaporation system is determined by comparing the second required time with a determination base time obtained by multiplying the first required time by a coefficient set previously based on the area of the base leak hole.

In the first measurement of the first required time, the leak points of the evaporation system are the leak hole as a failure and the base leak hole and in the second measurement of the second required time, the leak point is only the leak hole as a failure. Thus, the required time that is required for the pressure in the evaporation system to change from the first specified pressure to the second specified pressure is larger at the time of the second measurement in which the area of the leak point is smaller. According to the Bernoulli's theorem, the velocity of flow of gas at the leak point is equal if the pressure in the evaporation system is equal. Thus, the ratio of the foregoing second required time to the foregoing first required time is equal to the ratio of the area of the leak points at the time of the first measurement to the area of the leak point at the time of the second measurement.

Here, the ratio of the area of the leak points at the time of the first measurement to the area of the leak point at the time of the second measurement depends on the ratio of the area of the leak hole as a failure to the area of the base leak hole which causes leak only at the time of the first measurement.

Thus, by setting the foregoing coefficient on the basis of the area of the base leak hole and comparing the foregoing second required time with the foregoing determination base time obtained by multiplying the foregoing first required time by the above coefficient, it is possible to grasp the size of the leak hole as a failure on the basis of the magnitude of the above coefficient and the comparison in magnitude between the first required time and the second required time. In this manner, it is possible to practically determine the state of leak.

At the time of the first measurement and at the time of the second measurement, the amount of remaining fuel is not changed and hence the evaporation system is substantially equivalent, so it is possible to make a correct determination on the state of leak.

Further, in both of the first measurement and the second measurement, an initial pressure and a final pressure are specified pressures set previously, so even when the amount of remaining fuel is large and hence the volume of a space is small to which a pressure difference is applied, it is possible to correctly measure the state of change in pressure. Its effect is only to elongate the required time that is required for the pressure in the evaporation system to change from the first specified pressure to the second specified pressure. Thus, it is possible to substantially relax conditions allowing a proper leak check and to increase the frequency of determinations and to make a correct determination on the state of leak.

It is also recommended that the foregoing coefficient be set at the ratio of the total area of the leak points at the time of the first measurement that include the base leak hole and a leak hole as a failure to the area of the leak point at the time of the second measurement that includes only the leak hole as a failure at the time when the area of the leak hole as a failure is an allowable upper limit value.

The ratio of the foregoing second required time to the foregoing first required time is equal to the ratio of the area of the leak points at the time of the first measurement to the area of the leak point at the time of the second measurement. Here, if the foregoing coefficient is set at the ratio of the area of the leak points at the time of the first measurement to the area of the leak point at the time of the second measurement at the time when the area of the leak hole as a failure is the allowable upper limit value, it is possible to determine whether or not the area of the leak hole as a failure is smaller than its allowable upper limit value by whether or not the second required time is larger than the determination base time.

For example, if the allowable upper limit value of the area of the leak hole as a failure is the area of the base leak hole, in a case where the area of the leak hole as a failure is the allowable upper limit value, the ratio of the area of the leak points at the time of the first measurement to the area of the leak point at the time of the second measurement is two. Assuming that the coefficient is 2 by which the foregoing required time is multiplied when the determination base time is found, it is possible to determine that if the foregoing second required time is longer than the determination base time, the area of the leak hole as a failure is smaller than the allowable upper limit value and if the foregoing second required time is shorter than the determination base time, the area of the leak hole as a failure is larger than the allowable upper limit value.

In accordance with the second aspect of the invention, the pressure in the evaporation system is made the first specified pressure set previously, then the base leak hole is opened, and a required time is measured that is required for the pressure in the evaporation system to change from the first specified pressure to the second specified pressure set previously at a value closer to a pressure outside the evaporation system than the first specified pressure in a state where leak occurs at the base leak hole;

the pressure in the evaporation system is made the first specified pressure, then the foregoing base leak hole is closed, and a pressure reached in the evaporation system is measured when a determination base time obtained by multiplying the required time by a coefficient set previously based on the area of the base leak hole; and the state of the leak in the evaporation system is determined by comparing the pressure reached with the second specified pressure.

In the first measurement of the first required time, the leak points in the evaporation system are the leak hole as a failure and the base leak hole and in the second measurement of the second required time, the leak point is only the leak hole as a failure. Thus, the rate of change in the pressure in the evaporation system is smaller at the time of the second measurement in which the area of the leak point is smaller. According to the Bernoulli's theorem, the velocity of flow of gas at the leak point is equal if the pressure in the evaporation system is equal. Thus, when a time elapsing during a time period in which the pressure in the evaporation system changes from the same initial pressure to the same pressure is compared between the first measurement and the second measurement, the ratio of the time elapsing at the time of the second measurement to the time elapsing at the time of the first measurement is equal to the area of the leak points at the time of the first measurement to the area of the leak point at the time of the second measurement.

Here, the ratio of the area of the leak points at the time of the first measurement to the area of the leak point at the time of the second measurement depends on the ratio of the area of the leak hole as a failure to the area of the base leak hole which causes leak only at the time of the first measurement.

Thus, by setting the foregoing coefficient on the basis of the area of the base leak hole and comparing the foregoing pressure reached with the second specified pressure when the determination base time obtained by multiplying the foregoing required time by the above coefficient elapses in the second measurement, it is possible to grasp the size of the leak hole as a failure on the basis of the magnitude of the above coefficient and the comparison in magnitude between the foregoing pressure reached and the second specified pressure. In this manner, it is possible to practically determine the state of the leak.

At the time of the first measurement and at the time of the second measurement, the amount of remaining fuel is not changed and hence the evaporation system is substantially equivalent, so it is possible to make a correct determination on the state of the leak. Here, for example, when it is assumed that the coefficient is 2 by which the foregoing required time is multiplied when the determination base time is found, it is possible to determine that as the foregoing pressure reached has larger allowance for the second specified pressure, the leak hole as a failure becomes smaller in size than the base leak hole, and that as the foregoing pressure reached is larger than the second specified pressure, the leak hole as a failure is larger in size than the base leak hole.

Further, the rate of change in pressure in the second measurement is not so large as in the first measurement because only the leak hole as a failure causes the leak. Thus, if the foregoing coefficient is properly selected, even if the amount of remaining fuel is large and hence the volume of the space is small to which the pressure difference is applied, the pressure reached is not changed to the pressure outside the evaporation system. Moreover, as described above, since the rate of change in pressure is smaller in the second measurement than in the first measurement, it is easy to set the determination base time in such as way that the pressure reached does not become the pressure outside the evaporation system. Moreover, since the second measurement is finished regardless of the amount of leak at the time when the determination base time is reached, there is not presented a problem that as the amount of leak is smaller, a time period required to finish the measurement becomes longer, as is the invention claimed in claim 1. That is, a time period is not much varied that is required to perform the leak check. Thus, this can greatly relax conditions allowing the leak check and increase the frequency of determinations.

Here, in a case where the leak hole as a failure is so large that the quantitative estimation of leak is not required, needless to say, it is not always necessary to have allowance for the pressure outside the evaporation system when the determination base time elapses in the second measurement and it is recommendable to determine that the amount of leak is large when the pressure reaches a specified threshold within the determination base time.

It is recommended that the foregoing coefficient be set at the ratio of the total area of the leak points at the time of the first measurement that includes the base leak hole and the leak hole as a failure to the area of the leak point at the time of the second measurement that includes only the leak hole as a failure at the time when the area of the leak hole as a failure is an allowable upper limit value.

When the pressure in the evaporation system is changed to the second specified pressure in the second measurement and the time that elapses during an interval that the pressure in the evaporation system changes from the first specified pressure to the second specified pressure is compared between the second measurement and the first measurement, the ratio of the elapsed time at the time of the second measurement to the elapsed time at the time of the first measurement is equal to the ratio of the area of the leak points at the time of the first measurement to the area of the leak point at the time of the second measurement. Here, if the foregoing coefficient is set at the ratio of the area of the leak points at the time of the first measurement to the area of the leak point at the time of the second measurement at the time when the area of the leak hole as a failure is the allowable upper limit value, it is possible to determine whether or not the area of the leak hole as a failure is smaller than the allowable upper limit value by whether or not the pressure reached when the elapsed time at the time of the second measurement reaches the determination base time reaches the second specified pressure.

For example, if the allowable upper limit value of the area of the leak hole as a failure is the area of the base leak hole, in a case where the area of the leak hole as a failure is the allowable upper limit value, the ratio of the area of the leak points at the time of the first measurement to the area of the leak point at the time of the second measurement is two. Assuming that the coefficient is 2 by which the foregoing required time is multiplied when the determination base time is found, it is possible to determine that if the pressure reached does not reaches the second specified pressure, the area of the leak hole as a failure is smaller than the foregoing allowable upper limit value and if the foregoing pressure reached is larger than the second specified pressure, the area of the leak hole as a failure is larger than the allowable upper limit value.

It is also recommended that the pressure difference be produced by increasing the pressure in the evaporation system to make the state of change in pressure the state of decrease in pressure.

It is also recommended that the pressure difference be produced by decreasing the pressure in the evaporation system to make the state of change in pressure the state of increase in pressure.

In accordance with the third aspect of the invention, there is provided a failure diagnosis device for diagnosing an evaporated fuel treating unit, which comprises:

a passage for making the evaporation system communicate with an atmosphere;

throttling means mounted in the passage and having a certain passage cross-sectional area;

a valve for closing the passage;

first required time measuring means that controls the pressure difference producing means and the valve to make the pressure in the evaporation system a first specified pressure set previously, then opens the valve, and measures a first required time that is required for the pressure in the evaporation system to change from the first specified pressure to a second specified pressure set at a value closer to a pressure outside the evaporation system than the first specified pressure;

second required time measuring means that controls the pressure difference producing means and the valve to make the pressure in the evaporation system the first specified pressure, then closes the valve, and measures a second required time that is required for the pressure in the evaporation system to change from the first specified pressure to the second specified pressure; and determination means that determines the state of leak of the evaporation system by comparing the second required time with a determination base time obtained by multiplying the first required time by a coefficient set previously based on the passage cross-sectional area of the throttle means.

According to this aspect, it is possible to practically and correctly determine the state of leak and further to substantially relax conditions allowing a proper leak check and to increase the frequency of determinations.

It is also recommended that the foregoing coefficient be set at the ratio of the total area of leak points when the first required time is measured which includes the throttling means and a leak hole as a failure to the area of the leak point when the second required time is measured which includes only the leak hole as a failure at the time when the area of the leak hole as a failure is an allowable upper limit value.

In accordance with the fourth aspect of the invention, there is provided a failure diagnosis device for diagnosing the evaporated fuel treating unit, which comprises:

the passage for making the evaporation system communicate with an atmosphere;

the throttling means mounted in the passage and having a certain passage cross-sectional area;

the valve for closing the passage;

required time measuring means that controls the pressure difference producing means and the valve to make the pressure in the evaporation system the first specified pressure set previously, then opens the valve, and measures a required time that is for the pressure in the evaporation system to change from the first specified pressure to the second specified pressure set previously at the value closer to the pressure outside the evaporation system than the first specified pressure;

pressure reached measuring means that controls the pressure difference producing means to make the pressure in the evaporation system the first specified pressure, then closes the valve, and measures pressure reached in the evaporation system when a determination base time elapses that is obtained by multiplying the required time by a coefficient set previously based on the passage cross-sectional area of the throttle means; and determination means that determines the state of leak of the evaporation system by comparing the pressure reached with the second specified pressure.

According to this aspect, it is possible to practically and correctly determine the state of leak and further to substantially relax conditions allowing the proper leak check and to increase the frequency of determinations.

Here, in a case where the leak hole as a failure is so large that the quantitative estimation of leak is not required, needless to say, it is not always necessary to have allowance for the pressure outside the evaporation system when the determination base time elapses in the measurement of the pressure reached and it is recommendable to determine that the amount of leak is large when the pressure reaches a specified threshold within the determination base time.

It is also recommended that the foregoing coefficient be set at the ratio of the total area of the leak points when the foregoing required time is measured which includes the throttle means and the leak hole as a failure to the area of the leak point when the pressure reached is measured which includes only the leak hole as a failure at the time when the area of the leak hole as a failure is the allowable upper limit value.

It is also recommended that the foregoing pressure difference producing means be so constructed as to be means for increasing the pressure in the evaporation system to make the state of change in pressure the state of decrease in pressure.

It is also recommended that the foregoing pressure difference producing means be so constructed as to be means for decreasing the pressure in the evaporation system to make the state of change in pressure the state of increase in pressure.

It is also recommended that the foregoing pressure difference producing means be constructed by a motor-driven pump. In this case, the pump can be operated without the power of the internal combustion engine, so even when the engine is stopped, it is possible to perform the leak check and hence to increase the frequency of determinations.

It is also recommended that the failure diagnosis device further includes prohibition means that determines whether or not the internal combustion engine is in the state of operation and when it is in the state of operation, prohibits operations of the required time measuring means and the pressure reached measuring means.

During the operation of the internal engine, sometimes, the fuel is shaken by vibration to be abruptly evaporated and a fuel pump arranged in the fuel tank is heated to produce a sudden change in temperature. For this reason, there is a fear that a correct determination on the state of leak could not be preformed. According to the prohibition means, it is possible to eliminate the causes of error of determination and to perform the leak check correctly.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

First Embodiment

Figure 1:
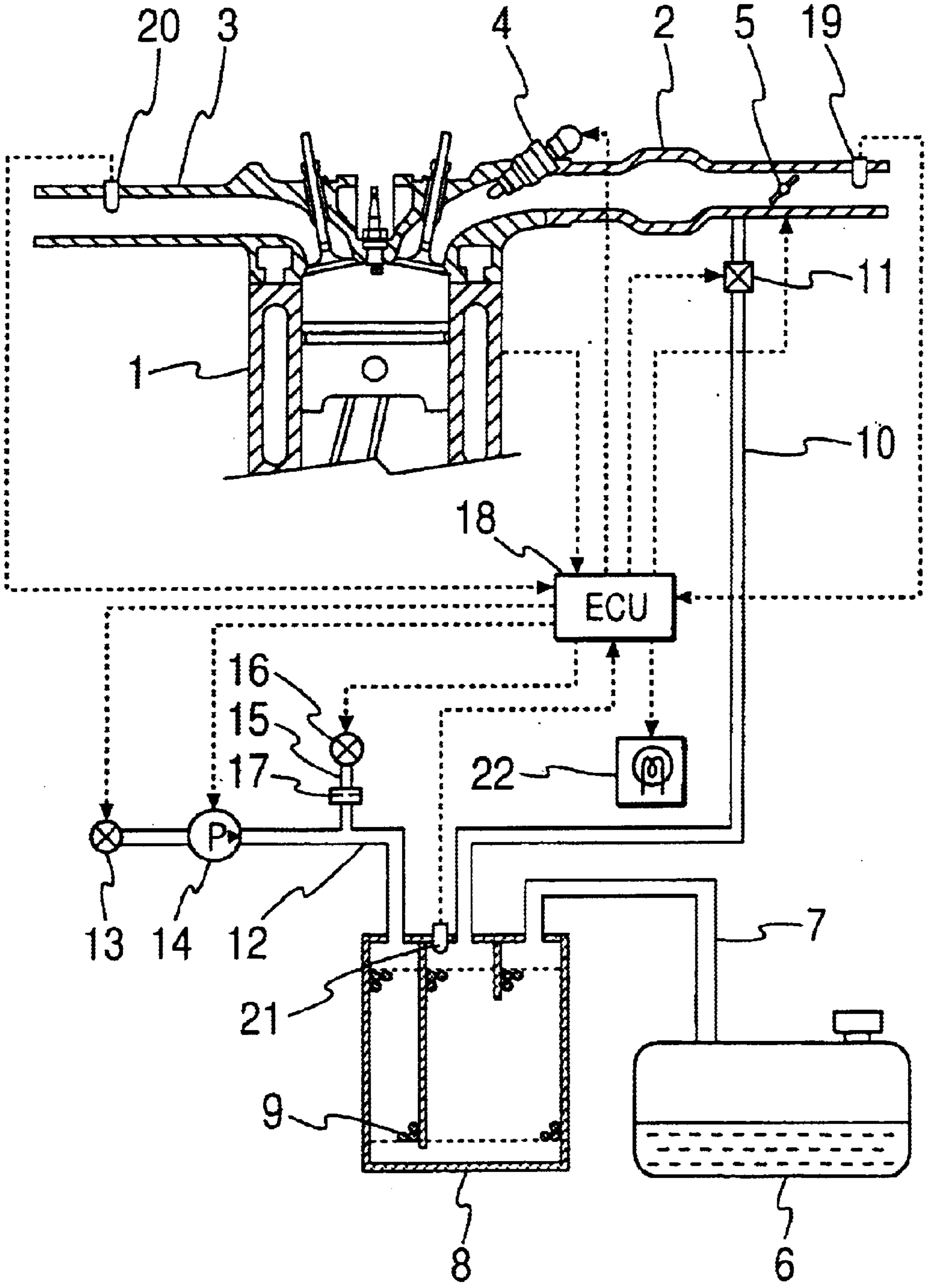
FIG. 1 is a block diagram showing the construction of an evaporated fuel treating unit in accordance with a first embodiment of the invention.

The construction of a failure diagnosis device of an evaporated fuel processing unit of a first embodiment of the present invention is shown in FIG. 1. In this embodiment, the invention is applied to an automobile mounted with an internal combustion engine (engine) 1. A fuel tank 6 of the engine 1 is connected to a canister 8 through an introduction passage 7 and always communicates with the canister 8. The canister 8 is filled with an absorbent 9 and fuel evaporated in the fuel tank 6 is temporarily absorbed by the absorbent 9. The canister 8 is connected to an intake pipe 2 of the engine 1 through a purge passage 10. The purge passage 10 is provided with a purge valve 11 that is a purge control valve and when the purge valve 11 is opened, the canister 8 is made to communicate with the intake pipe 2. A solenoid valve is used as the purge valve 11.

The purge valve 11 is controlled by an electronic control unit (hereinafter referred to as ECU) 18 for controlling parts of the engine 1. The ECU 18 has a basic construction used for a general engine. The ECU 18 controls such parts as an injector 4 that is mounted in the intake pipe 2 and injects fuel, a throttle 5 that adjusts the amount of intake air, and the like based on the amount of intake air by an air flow sensor 19 mounted in the intake pipe 2, a fuel-air ratio detected by a fuel-air ratio sensor 20 fixed to an exhaust pipe 3, an ignition signal, an engine speed, the temperature of engine cooling water, an accelerator position, and the like to provide a suitable amount of fuel injected and a suitable throttle opening. The opening of the purge valve 11 is controlled by a duty control or the like by the ECU 18 when the engine is operated. The purge valve 11 controls a flow rate of evaporated fuel in the purge passage 10. The evaporated fuel separated from the absorbent 9 is purged into the intake pipe 2 by a negative pressure and is burned with the fuel injected by the injector 4.

An atmosphere passage 12 opened to the atmosphere at its tip is connected to the canister 8. The atmosphere passage 12 is provided, in order closer to the tip side, with a closed valve 13 and a pump 14 that is means for increasing pressure. When the pump 14 is operated with the closed valve 13 opened, air from the atmosphere is pressurized and sent to the canister 8. When the closed valve 13 is closed, the atmosphere passage 12 is closed at the tip. A solenoid type two-way valve is used as the closed valve 13. Here, there is nothing wrong with reversing the placement of the closed valve 13 and the pump 14.

A base leak passage 15 that is a passage converging on the atmosphere passage 12 at a point closer to the canister 8 than the pump 14 is connected to the atmosphere passage 12. The base leak passage 15 is open to the atmosphere at the tip. The base leak passage 15 is provided, in order closer to the tip side, with a base leak valve 16 that is a valve and a base orifice 17 that is means for throttling the flow of air. The base orifice 17 is a fixed orifice having a determined passage area. When the base leak valve 16 is opened, gas can flow within a range throttled by the base orifice 17. When the base leak valve 16 is closed, the base leak passage 15 is closed at the tip side. A solenoid type two-way valve is used as the base leak valve 16. Here, there is nothing wrong with reversing the displacement of the base leak valve 16 and the base orifice 17.

The closed valve 13, the pump 14, the base leak valve 16 that have been described above, the foregoing purge valve 11, and the like are controlled by the ECU 18. When the purge valve 11, the closed valve 13, the base leak valve 16 are closed, a combined body (which is to be checked for leak and hereinafter referred to as an evaporation system) of the fuel tank 6, the introduction passage 7, the canister 8, the purge passage 10 and the atmosphere passage 12 and a leak passage 15 accompanying them forms a closed space forming body that forms a closed space. When the purge valve 11 is in a closed state, the evaporated fuel can be diffused in the evaporation system. Further, when the pump 14 is operated in a state where only the closed valve 13 is opened, it is possible to increase the pressure in the evaporation system and hence to produce a pressure difference between inside the evaporation system and outside the evaporation system that is in an atmospheric pressure.

Further, the canister 8 is provided with a pressure sensor 21 that is pressure detecting means for detecting the pressure in the canister 8 and the detection signal of the pressure sensor 21 is applied to the ECU 18 as a signal for leak check. The pressure sensor 21 detects the pressure in the evaporation system and a place where the pressure sensor 21 is fixed is not limited in the canister 8 but can be in a member constructing the evaporation system, for example, can be in the introduction passage 7 or the purge passage 10.

Alarm unit 22, e.g., an indicator, for giving a driver an alarm when an abnormality is found by a leak check is provided in a vehicle compartment. The alarm unit 22 is operated by the ECU 18.

Figure 2:
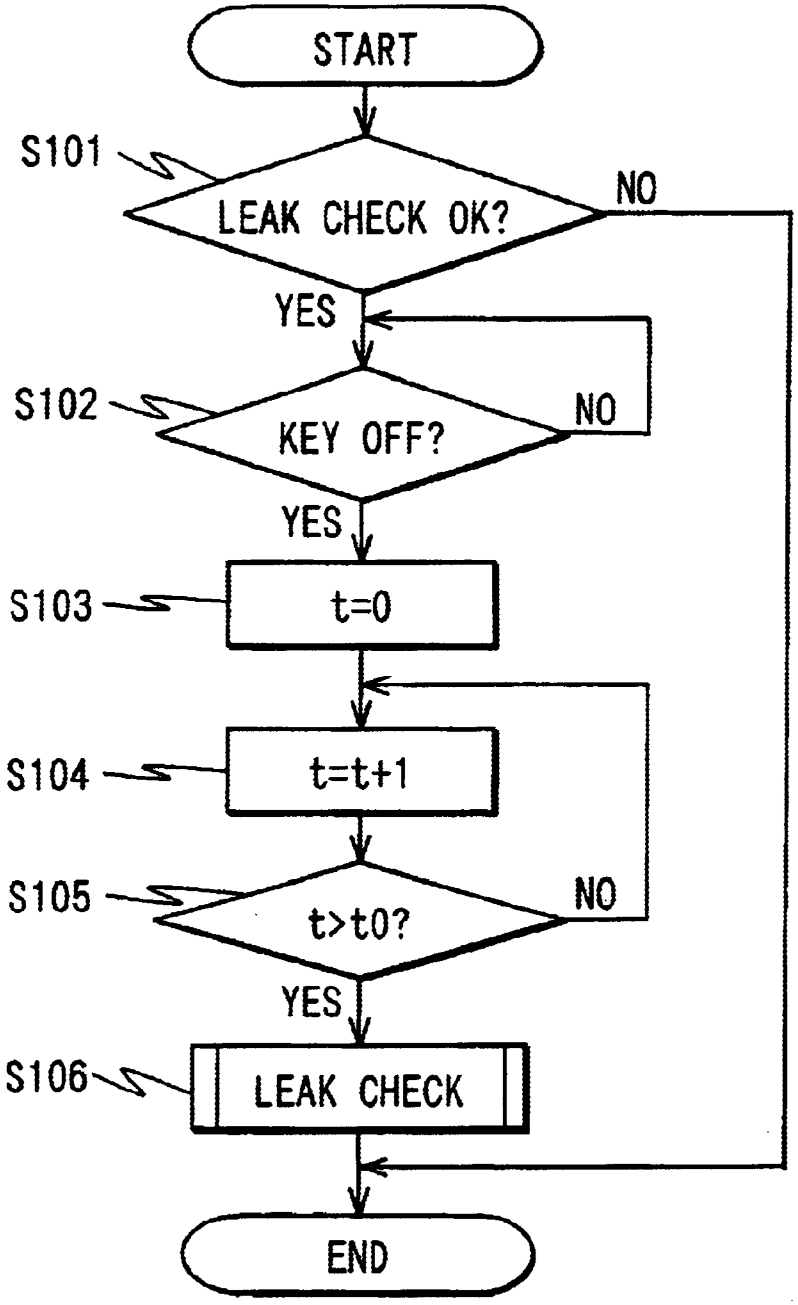
FIG. 2 is a flowchart in accordance with the first embodiment.
Figure 3:
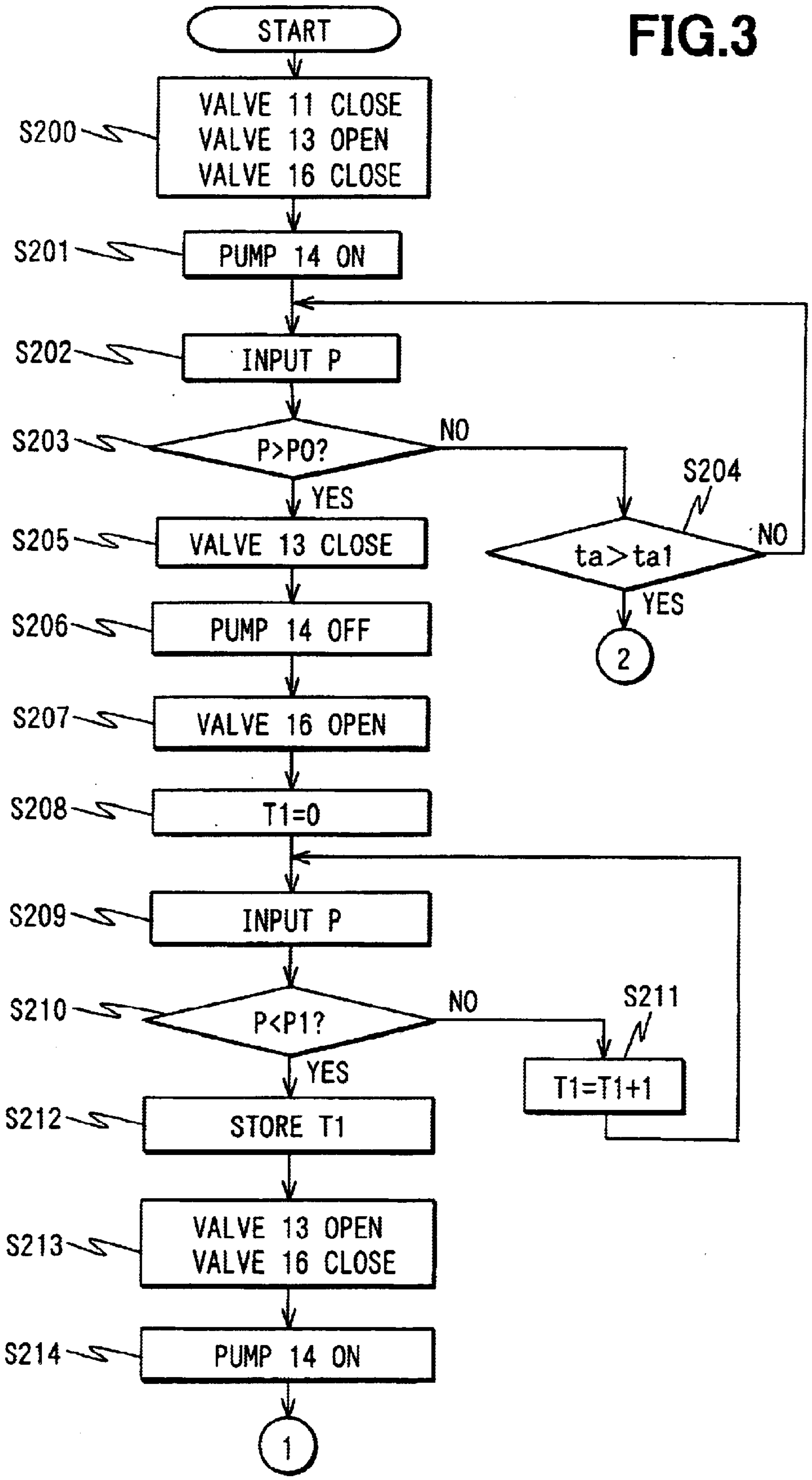
FIG. 3 is the flowchart in accordance with the first embodiment.
Figure 4:
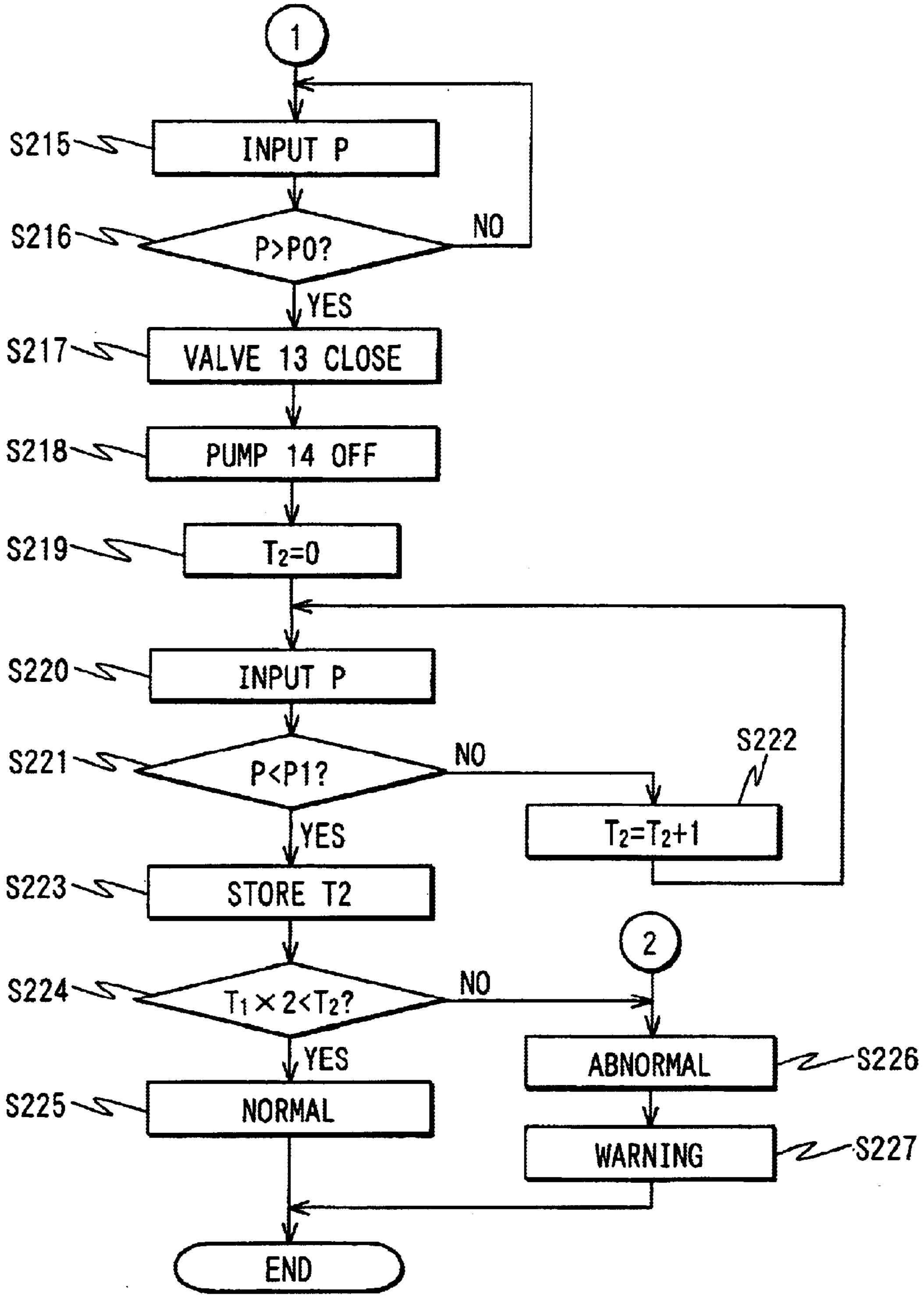
FIG. 4 is the flowchart in accordance with the first embodiment.

Control conducted by the ECU 18 when the leak check is performed is shown in FIG. 2, FIG. 3, and FIG. 4. A failure diagnosis method and the operation of a failure diagnosis device in accordance with the invention will be described. Steps from S101 to S105 are procedures for determining whether a leak check is allowed or not and prevent the leak check from being conducted in a state where there might produce an error, in the determination of the leak check. First, it is determined at Step S101 whether conditions of the leak check are met or not. The conditions of the leak check are met when driving conditions, temperature conditions and the like satisfy predetermined conditions. When it is determined that the conditions of the leak check are met, the procedure proceeds to Step S102 and when it is determined that the conditions of the leak check are not met, the flow of procedures is finished. In this manner, for example, the leak check under high temperature is prevented.

Step S102 is a procedure as prohibition means where it is determined whether the engine is in a state of stop or not, that is, a key is turned off or not. When it is determined that the key is turned off, the procedure proceeds to Step S103 and when it is determined that the key is not turned off, the procedure waits until the key is turned off (Step S102). During the operation of the engine, temperature in the fuel tank 6 is increased by heat generated by a fuel pump and the like or fuel in the fuel tank 6 is shaken by the running state of a vehicle or road noises, so that the fuel is remarkably evaporated in some cases. The leak check is eliminated when the fuel is evaporated to vary the pressure in the evaporation system.

Step S103 to Step S105 are procedures for waiting for a predetermined time t0 set previously to elapse after the key is turned off and at Step S103, a timer t is reset (t=0) and at Step S104, the timer t is advanced by 1. Then, it is determined at Step S105 whether the timer t reaches t0 or not. When it is determined that the timer t reaches t0 , the leak check is conducted at Step S106. When it is determined that the timer t does not reach to, the procedure returns to Step S104 where the procedure waits for a predetermined time t0 to elapse. Since the state in the fuel tank 6 is not stabilized just after the key is turned off, the leak check is eliminated in a state where the state in the tank 6 is not stabilized.

The leak check (Step S106) will be described in detail. Operations of the respective valves 13, 16 and the pump 14 follow timing charts shown in FIG. 5.

Steps S200 to S212 are first measuring procedures as the first required time measuring means of the ECU 18. First, at Step S200, the purge valve 11 and the base leak valve 16 are closed to close the evaporation system at the purge valve 11 and the base leak valve 16 and the closed valve 13 is opened. Next, at Step S201, the pump 14 is turned on to increase the pressure in the evaporation system (t1). Here, the capacity (amount of discharge) of the pump 14 is set in such a way that even when a leak as large as a leak regulatory value occurs at any part in the evaporation system, the pressure in the evaporation system is increased. Pressure detected by the pressure sensor 21 is gradually increased.

Incidentally, as shown at Step S200 and S201, by closing the purge valve 11 and the base leak valve 16 before turning on the pump 14, it is possible to prevent the pressure from being dropped by the pump 14 being operated before the purge valve 11 and the base leak valve 16 are completely closed and hence to conduct the leak check with high efficiency. Needless to say, it is also recommended that the pump 14 be turned on at the same time when the purge 11 and the base leak valve 16 are closed, depending on the responsivity or the required specifications of the solenoid valve used as the purge valve 11 and the base leak valve 16.

Pressure P is measured at Step S202 and it is determined at the next Step S203 whether or not the measured pressure P is larger than a specified pressure P0 set previously. When it is determined that the measured pressure P is larger than the specified pressure P0, the procedure proceeds to Step S205 and when it is determined that the measured pressure P is not larger than the specified pressure P0, the procedure waits for the pressure P to increase (Step S202, S203). At this time, it is determined at Step S204 whether or not an elapsed time ta after the operation of the pump 4 is longer than a predetermined time ta1. Here, the predetermined time ta1 is a time to drive the pump 4 that is required for the pump 4 to increase the pressure in the evaporation system to the specified pressure P0 in a case where a leak corresponding to a base value occurs in the evaporation system. In a case where a very large leak occurs in the evaporation system, even if the pump 4 is operated for a sufficient time, the pressure in the evaporation system does not reach the specified pressure P0. For this reason, in a case where the elapsed time ta is longer than the predetermined time ta1 at Step S204, the procedure proceeds to Step S226 where it is determined that the leak of the evaporation system is abnormal.

When the pressure P is larger than the specified pressure P0, the closed valve 13 is closed at Step S205 and the pump 14 is turned off at Step S206. In this manner, the evaporation system is closed at the position of the closed valve 13 in addition to the positions the purge valve 11 and the base leak valve 16.

By closing the closed valve 13 before turning off the pump 14 as shown at Steps S205, S206, it is possible to prevent the pressure from being dropped by the pump 14 being turned off before the closed valve 13 is completely closed. Here, for the convenience of description, in FIG. 5, the pump 14 is turned off at the same time when the closed valve 13 is closed. Needless to say, it is also recommended that the pump 14 be turned off at the same time when the closed valve 13 is closed, depending on the responsivity and the required specifications of the solenoid valve used for the closed valve 13.

Next, the base leak valve 16 is opened at Step S207 (t2). In this manner, gas in the evaporation system pressurized to the specified pressure P0 passes through the base orifice 17 and flows out of the tip of the base leak passage 15. The base orifice 17 is a base leak hole the passage cross-sectional area of which is known. When the evaporation system has a leak hole as a failure, the gas flows out of the leak hole. This outflow of gas varies the pressure in the evaporation system. This state of change in the pressure is a state of decrease in the pressure where the pressure in the evaporation system decreases toward the pressure outside the evaporation system that is the atmospheric pressure.

When the base leak valve 16 is opened, a timer T1 is reset (T1=0) at Step S208.

The pressure P is measured at Step S209 and it is determined at the following Step S210 whether or not the measured pressure P is lower than the specified pressure P1 set previously. When it is determined that the measured pressure P is lower than the specified pressure P1, the procedure proceeds to Step S212. When it is determined that the measured pressure P is not lower than the specified pressure P1, at Step S211, the timer T1 is advanced (T1=T1+1) and the procedure returns to Step S209. That is, a required time is measured that is required for the pressure in the evaporation system to decrease from the first specified pressure P0 to the second specified pressure P1 lower than the first specified pressure P0.

When the pressure P reaches the second specified pressure P1 (t3), the required time T1 is stored in a memory at Step S212.

The following Step S213 to S223 are second measurement procedures and procedures as the second required time measuring means of the ECU 18. Like the procedures at from Steps S200 to S212, a time is determined that is required for the pressure in the evaporation system to decrease from the first specified pressure P0 to the second specified pressure P1 with the base leak valve 16 closed. That is, at Step S213, the base leak valve 16 is closed to close the evaporation system at the positions of the purge valve 11 and the base leak valve 16 and the closed valve 13 is opened. Then, at Step S214, the pump 14 is turned on to increase the pressure in the evaporation system.

In this respect, it is also recommended that also at Steps S213, S214, the pump 14 be turned on at the same time when the base leak valve 16 is closed.

At Step S215, the pressure P is measured and at the following Step S216, it is determined whether or not the measured pressure P is higher than the specified pressure P0 set previously. When it is determined that the measured pressure P is higher than the specified pressure P0, the procedure proceeds to Step S217 and when it is determined that the measured pressure P is not higher than the specified pressure P0, the procedure waits for the pressure P to increase (Step S215, S216).

When the pressure P is higher than the specified pressure P0, the closed valve 13 is closed at Step S217 and the pump 14 is turned off at Step S218 (t4). In this manner, the evaporation system is closed at the position of the closed valve 13 in addition of the positions of the purge valve 11 and the base leak valve 16.

In this respect, it is also recommended that also at Steps S217, S218, the pump 14 be turned on at the same time when the closed valve 13 is closed.

In the evaporation system after this t4, the base leak valve 16 is closed, which is different from a state during a period from t2 to t3 , and hence the gas in the evaporation system pressurized to the specified pressure P0 flows out of only the leak hole as a failure to reduce the pressure in the evaporation system. Here, in a period after t4 and in a period from t2 to t3 , the amount of remaining fuel is equal to each other and hence the volume of a space to be pressurized in the evaporation system is also equal and an atmospheric temperature is also substantially equal to each other. Needless to say, the property of the fuel is also equal. Thus, the states in both the periods are assumed to be equivalent except that they are different in a portion where a gas leak occurs.

When the pump 14 is turned off, the timer T2 is reset at Step S219 (T2=0).

At Step S220, the pressure P is measured and at the following Step S221, it is determined whether or not the measured pressure P is lower than the specified pressure P1. When it is determined that the measured pressure P is lower than the specified pressure P1, the procedure proceeds to Step S223, and when it is determined that the measured pressure P is not lower than the specified pressure P1, the timer T2 is advanced (T2=T2+1) at Step S222 and the procedure returns to Step S220. That is, a time is measured that is required for the pressure P in the evaporation system to decrease from the first specified pressure P0 to the second specified pressure P1.

When the pressure P reaches the second specified pressure P1 (t5), the required time T2 is stored in a memory at Step S223.

At the following Steps S224 to S227, it is determined whether a leak occurs in the evaporation system. This is a procedure as the determination means of the ECU 18.

Here, before the description of a determination procedure, a determination principle will be described. In a case where gas leaks from the evaporation system, as is known from the Bernoulli's theorem expressed by an equation (1), if the pressure in the evaporation system is equal, the velocity of flow of leaking gas is equal at any leak point regardless of the area A of the leak point. In the following equation (1), v is the velocity of flow, P is pressure, ρ is density, g is gravity, and z is position in a vertical direction.

$$V^2/2+P/\rho+gz=\text{constant} \qquad (1)$$

Therefore, under the same pressure, the flow rate of the leaking gas Q (=v×A) is proportional to the area A of the leak point. If the area A doubles, the flow rate of the leaking gas Q also doubles and hence the rate of decrease in the pressure caused by the leak also doubles. In other words, in a case where a leak hole is formed in a substantially closed space, if the area A of the leak hole doubles, a time becomes one half that is required for the pressure to decrease from the same initial pressure by the same pressure difference ΔP.

In this embodiment, the area of the leak hole is determined by using the above principle. First, a case is assumed in which a leak hole equal to the base orifice 17 is formed in the evaporation system by a failure. In this case, the total of area of the leak holes when the base leak valve 16 is closed is one half of the total area of the leak holes when the base leak hole 16 is opened. For this reason, the required time T2 is two times the required time T1. That is, T2=T1×2. The required time T2 is a time required for the pressure P to decrease to the second specified pressure P1 when the base leak valve 16 is closed. The required time T1 is a time required for the pressure P to decrease to the second specified pressure P1 when the base leak valve 16 is opened.

Next, a case is assumed in which the leak hole larger than the base orifice 17 is formed in the evaporation system by a failure. In this case, the total area of the leak holes when the base leak valve 16 is closed is large than one half of the total area of the leak holes when the base leak hole 16 is opened. For this reason, the required time T2 is smaller than two times the required time T1. That is, T2<T1×2.

Further, a case is assumed in which the leak hole smaller than the base orifice 17 is formed in the evaporation system by a failure. In this case, the total area of the leak holes when the base leak valve 16 is closed is smaller than one half of the total area of the leak holes when the base leak hole is opened. For this reason, the required time T2 is larger than two times the required time T1. That is, T2 >T1×2.

Therefore, at Step S224, the required time T2 is compared with a determination base time (T1×2) obtained by multiplying the required time T1 by a coefficient 2 and it is determined whether or not T2>T1×2. That is, by comparing the required time T2 with the determination time T1×2, it is determined whether or not the area of the leak hole as a failure is larger than the passage cross-sectional area of the base orifice 17. When it is determined that the area of the leak hole as a failure is larger than the passage cross-sectional area of the base orifice 17, it is determined that the leak is little and the procedure proceeds to Step S225 where the leak of the evaporation system is diagnosed as being normal to finish the leak check. When it is determined at Step S224 that the area of the leak hole as a failure is not larger than the passage cross-sectional area of the base orifice 17, it is determined that the leak is much and the procedure proceeds to Step S226 where the leak of the evaporation system is diagnosed as being abnormal. Then, at Step S227, the alarm unit 22 is operated to finish the leak check.

In a case of the first measurement where the leak occurs at the base orifice 17 and in a case of the second measurement where the leak does not occur at the base orifice 17, the evaporation system is substantially equal in the mount of remaining fuel and the atmospheric temperature and hence the amount of remaining fuel and the atmospheric temperature do not produce effects. Thus, it is not necessary to make a correction based on these factors. Further, since the pump 14 stops increasing the pressure in the evaporation system at the specified pressure P0, it is not necessary to use the pump 14 having a high discharge capacity. Still further, this shortens the operating time of the pump 14, reduces load applied to the pump 14, and hence elongates the life of the pump 14. Thus, this reduces power consumption and hence saves energy.

Further, in both cases of measurements, along with the initial pressure, the final pressure is the specified pressure P1 set previously, so that even when the amount of remaining fuel is large and the volume to be pressurized is small, the effects produced by these factors are only to shorten the required times T1 and T2 that are required for the pressure to decrease from the first specified pressure PO to the second specified pressure P1. Therefore, it is possible to always determine the state of the leak correctly. This can greatly relax conditions allowing the proper leak check and hence increase the frequency of determinations.

Here, while the determination base time is obtained by multiplying T1 by a coefficient of 2, the coefficient is not always limited to 2 but can be 3, for example. In this case, an upper limit value (determination base value) allowed as the area of the leak hole as a failure becomes one half of the passage cross-sectional area of the base orifice 17, and when the leak hole as a failure equal to the determination base value is formed in the evaporation system, the required time T2 becomes equal to the determination base time (T1×3). This is because the ratio of the area of the leak hole at the time of the first measurement to the area of the leak hole at the time of the second measurement becomes 3.

In general, the following equations hold. Assuming that the passage cross-sectional area of the base orifice 17 is A0 and the area of the leak hole as a failure AL, the equations (2) and (3) hold.

$$1/T1:1/T2=(A0+AL):AL \qquad (2)$$

$$T2/T1=(A0+AL)/AL \qquad (3)$$

Thus, when the upper limit (determination base value) allowed as the area AL of the leak hole as a failure is expressed by αA0 by using the passage cross-sectional area A0 of the base orifice 17 as a unit and the area of the leak hole as a failure is the determination base value αA0, the following equation (4) is obtained from the equation (3). Thus, a coefficient by which the required time T1 is multiplied when the determination base time is set becomes (1+α)/α.

$$T2/T1=(1+\alpha)/\alpha \qquad (4)$$

Thus, a case where the required time T2 is compared with the required time T1×2 is an example in which α=1, and a case where the required time T2 is compared with the required time T1×3 is an example in which α=½.

As described above, by setting the coefficient by which the required time T1 is multiplied when the determination base time is found based on the determination base value obtained by using the passage cross-sectional area of the base orifice 17 as a unit, it is possible to grasp the size of the leak hole as a failure by the magnitude of the coefficient (1+α)/α and a comparison in magnitude between the required time T2 and the determination base time (T1×(1+α)/α).

Then, by setting the coefficient (1+α)/α at the ratio of the area (A0+AL) of the leak points at the time of the first measurement to the area AL of the leak point at the time of the second measurement at the time when the area AL of the leak hole as a failure is the allowable upper limit value αA0, it is possible to determine whether or not the area AL of the leak hole as a failure is smaller than the allowable upper limit value αA0 by the comparison in magnitude between the foregoing required time T2 and the determination base time (T1×(1+α)/α). Thus, it is possible to set the determination base value regardless of the size of the base orifice 17.

Second Embodiment

A second embodiment of the invention will be described based on from FIG. 6 to FIG. 9. The second embodiment adopts the construction shown in FIG. 6. The components described in the foregoing embodiment are denoted by the same reference symbols and descriptions will be focused on differences between the second embodiment and the foregoing embodiment.

Figure 7:
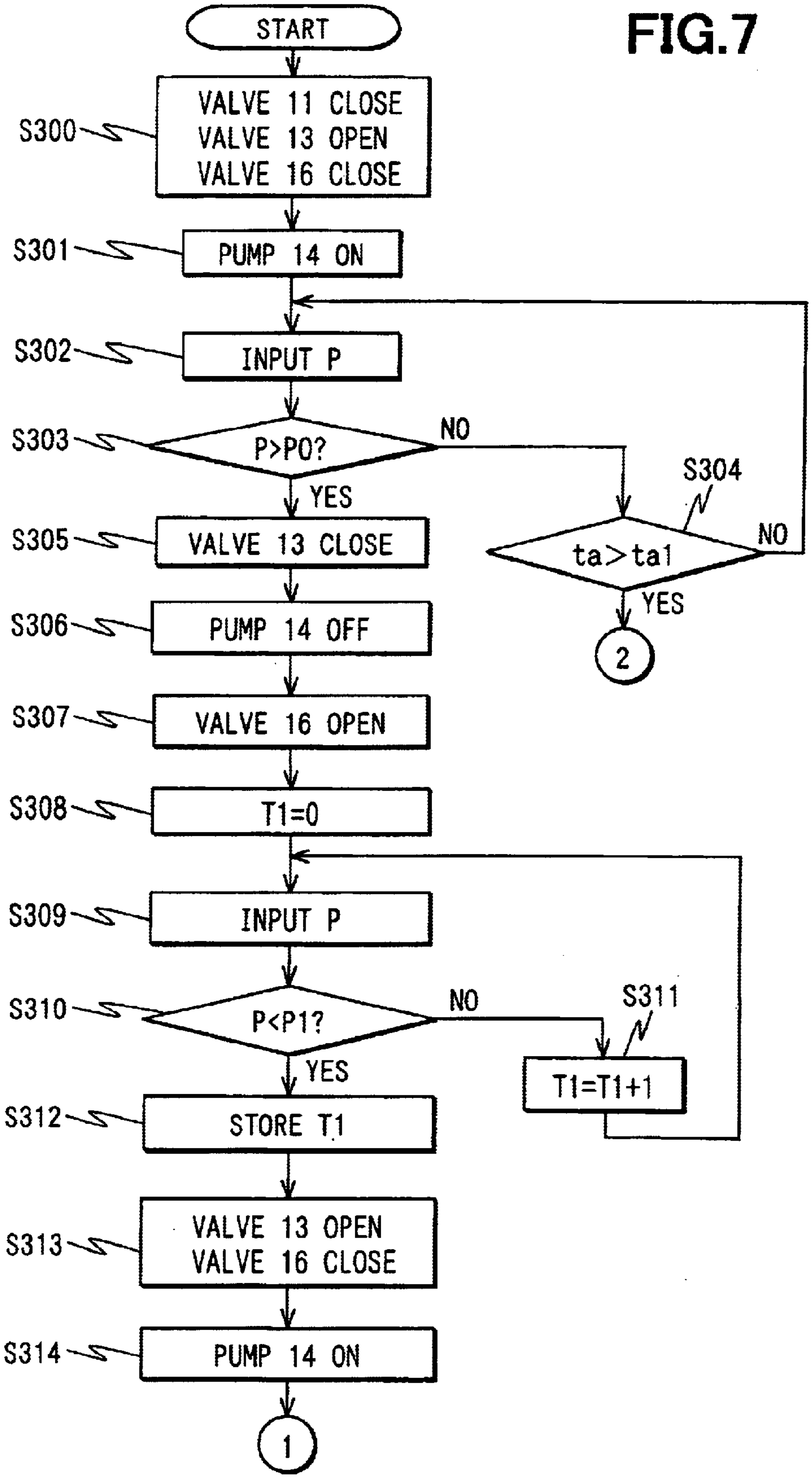
FIG. 7 is a flowchart in accordance with the second embodiment.
Figure 8:
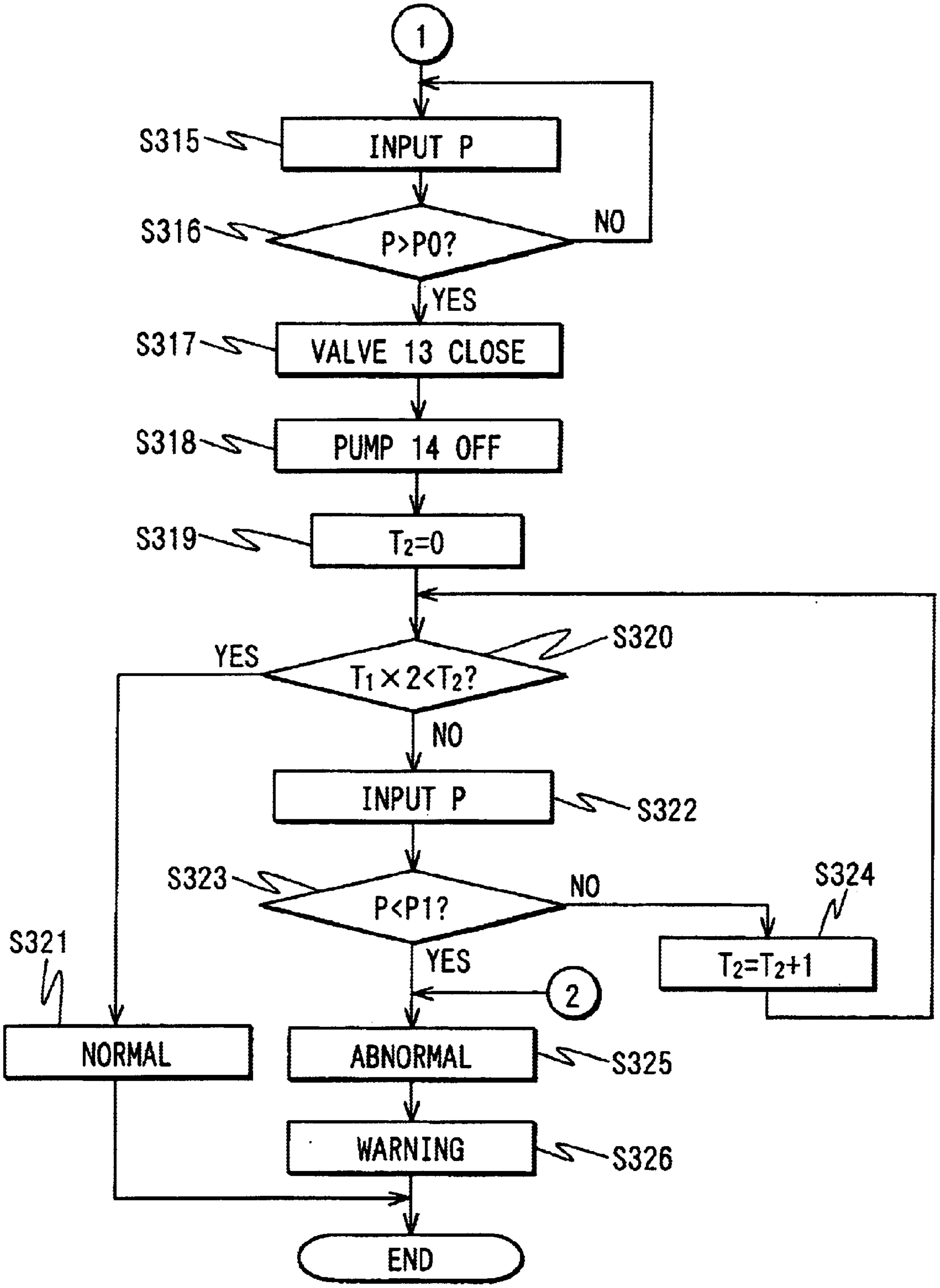
FIG. 8 is the flowchart in accordance with the second embodiment.
Figure 9:
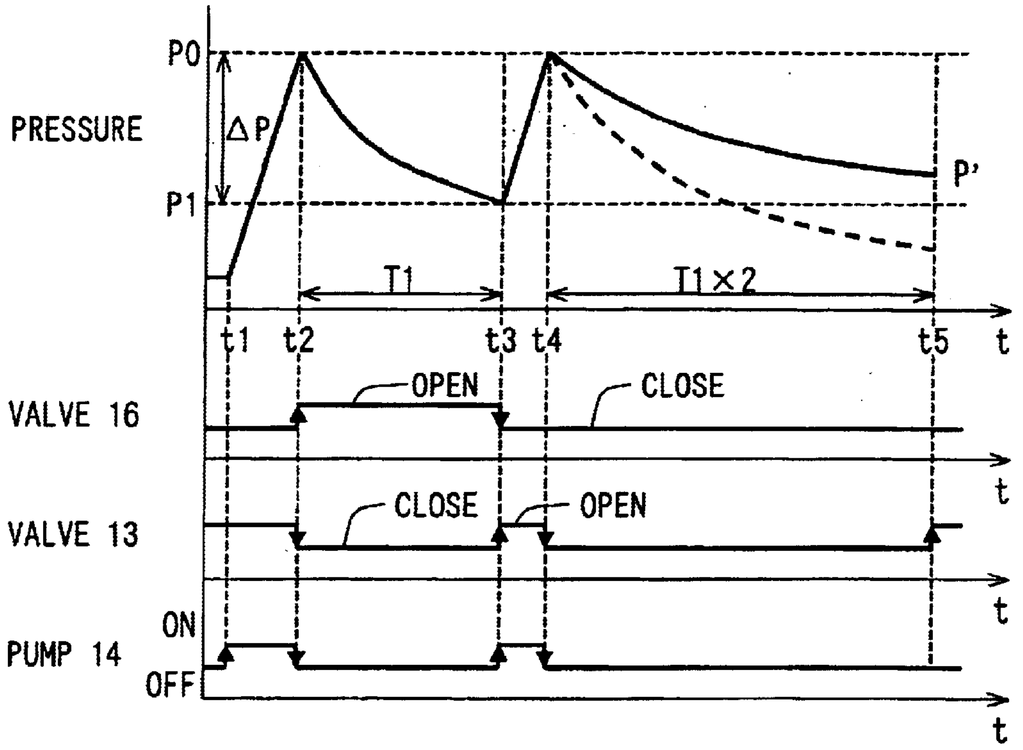
FIG. 9 is a timing chart in accordance with the second embodiment.

The procedures of the leak check performed by the ECU 18A are shown in FIG. 7 and FIG. 8. FIG. 9 shows the waveforms of respective parts at the time of the leak check. Steps from S300 to S319 are equal to Steps from S200 to S219.

The following Steps from S313 to S319 and from S322 to S324 are second measurement procedures and construct means for measuring a pressure reached of the ECU 18A.

Of the following Steps from S320 to S326, at Steps S320, S321, S323, A325, and S326, it is determined whether or not leak occurs in the evaporation system. These are procedures as the determination means of the ECU 18A. At Step S320, T2 is compared with T1×2 and it is determined whether or not T2 is larger than T1×2. When it is determined that T2 is larger than T1×2, the procedure proceeds to Step S321 and when it is determined that T2 is not larger than T1×2, the procedure proceeds to Step S322. The procedure proceeds to Step S322 immediately after t4 when the timer T2 is reset. The Step S321 will be described later.

At Step S322, the pressure P is measured and at the following Step S323, it is determined whether or not the measured pressure P is lower than the foregoing specified pressure P1. When it is determined that the measured pressure P is lower than the foregoing specified pressure P1, the procedure proceeds to Step S325 and when it is determined that the measured pressure P is not lower than the foregoing specified pressure P1, the procedure proceeds to Step S324. The procedure proceeds to Step S324 just after t4 when the time T2 is reset.

At Step S324, the timer T2 is advanced (T2=T2+1). Then, the procedure returns to Step S320. That is, while it is being monitored after t4 whether or not the time T2 that elapses after the pressure P in the evaporation system becomes the specified pressure P0 and then the pump 14 is turned off is larger than the determination base time T1×2 (Step S320) and whether or not the pressure P is lower than the foregoing specified pressure P1 (Step S322), the pressure decreases from the first specified pressure P0 to the second specified pressure P1.

In this embodiment, the area of the leak hole is determined by using the above principle. First, a case is assumed in which the leak hole equal to the base orifice 17 is formed in the evaporation system by a failure. In this case, the total of area of the leak holes when the base leak valve 16 is closed is one half of the total area of the leak holes when the base leak hole 16 is opened. For this reason, the required time T2 is two times the required time T1. That is, T2=T1×2. The required time T2 is a time required for the pressure P to decrease to the second specified pressure P1 when the base leak valve 16 is closed. The required time T1 is a time required for the pressure P to decrease to the second specified pressure P1 when the base leak valve 16 is opened. The pressure reached P' when the required time T2 reaches the determination base time T1×2 is the foregoing specified pressure P1.

Next, a case is assumed in which the leak hole larger than the base orifice 17 is formed in the evaporation system by a failure. In this case, the total of area of the leak holes when the base leak valve 16 is closed is large than one half of the total area of the leak holes when the base leak hole 16 is opened. For this reason, the required time T2 is smaller than two times the required time T1. That is, T2<T1×2. Thus, the pressure becomes smaller than the specified pressure P1 before the time T2 reaches the determination base time T1×2. That the pressure becomes smaller than the specified pressure P1 before the time T2 reaches the determination base time T1×2 is equivalent to that the pressure reached P1 when the determination base time T1×2 elapses becomes smaller than the specified pressure P1.

Further, a case is assumed in which the leak hole smaller than the base orifice 17 is formed in the evaporation system by a failure. In this case, the total of area of the leak holes when the base leak valve 16 is closed is smaller than one half of the total area of the leak holes when the base leak hole is opened. For this reason, the required time T2 is larger than two times the required time T1. That is, T2>T1×2. Thus, even when the required time T2 becomes the determination base time T1×2, the pressure P does not reach the specified pressure P1. The pressure reached P' when the determination base time T1×2 elapses is larger than the specified pressure P1.

Thus, when it is determined earlier at Step S320 that the lapsed time T2 is larger than the determination base time T1×2, it is determined that the leak is little and the procedure proceeds from Step S320 to Step S321 where the leak of the evaporation system is diagnosed as being normal and then the leak check is finished. On the other hand, when it is determined earlier at Step S323 that the pressure P is lower than the specified pressure P1, it is determined that the leak is much and the procedure proceeds from Step S323 to Step S325 where the leak of the evaporation system is diagnosed as being abnormal. Then, at the following Step S326, the alarm unit 22 is operated and then the leak check is finished.

Also in this embodiment, in a case of the first measurement where leak occurs at the base orifice 17 and in a case of the second measurement where the leak does not occur at the base orifice 17, the evaporation system is substantially equal in the amount of remaining fuel (the volume of the space) and the atmospheric temperature, and hence the amount of remaining fuel and the atmospheric temperature do not produce effects. Thus, it is not necessary to make a correction based on these factors. Further, since the pump 14 stops increasing the pressure at the specified pressure P0, it is not necessary to use the pump 14 having a high discharge capacity. Still further, this shortens the operation time of the pump 14 and reduces load applied to the pump 14 and hence elongates the life of the pump 14. Thus, this reduces power consumption and saves energy.

In contrast to the first embodiment in which it is determined whether the leak is much or little by the length of time required for the pressure P to decrease from the specified pressure P0 to the specified pressure P1, in this embodiment, it is determined whether the leak is much or little by the determination as to which of the time when the lapsed time T2 becomes larger than the determination base time T1×2 and the time when the pressure P becomes lower than the specified pressure P1 comes earlier, so that after the determination base time T1×2 is reached, it is not necessary to measure the state of decrease in the pressure P. Thus, it is possible to perform the leak check within a short time.

Here, while the determination base time is obtained by multiplying T1 by a coefficient of 2, the coefficient is not always limited to 2 but can be 3, for example. In this case, an upper limit value (determination base value) allowed as the area of the leak hole as a failure is one half of the passage cross-sectional area of the base orifice 17, and when a leak equal to the determination base value occurs in the evaporation system, a pressure reached P' at the time when the determination base time T1×3 elapses becomes equal to the specified pressure P1. This is because the ratio of the area of the leak points at the time of the first measurement to the area of the leak point at the time of the second measurement is 3.

Further, by setting the coefficient by which the required time T1 is multiplied when the determination base time is found based on the determination base value obtained by using the passage cross-sectional area of the base orifice 17 as a unit, it is possible to grasp the size of the leak hole as a failure by the magnitude of the coefficient and the comparison in magnitude between the pressure reached P' and the second specified pressure P1.

Then, by setting the coefficient by which the required time T1 is multiplied at the ratio of the area of the leak points at the time of the first measurement to the area of the leak point at the time of the second measurement at the time when the area of the leak hole as a failure is the allowable upper limit value, it is possible to determine whether or not the area of the leak hole as a failure is smaller than the allowable upper limit value by the comparison in magnitude between the pressure reached P1 and the second specified pressure P1. Thus, it is possible to set the determination base value regardless of the size of the base orifice 17.

Third Embodiment

Figure 10:
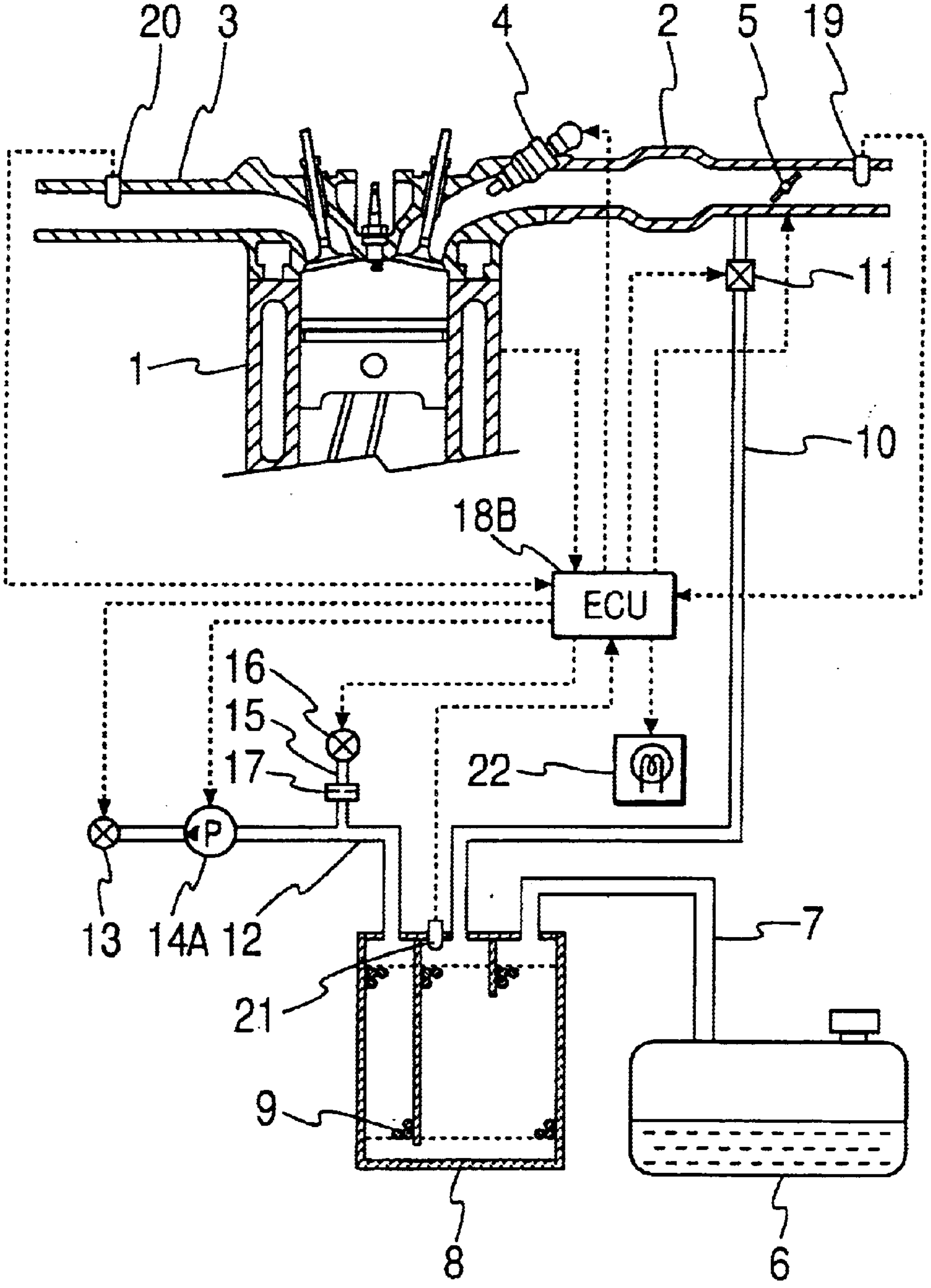
FIG. 10 is a block diagram showing the construction of an evaporated fuel treating unit in accordance with a third embodiment of the invention.

In a third embodiment of the invention, a pressure difference is produced between inside the evaporation system and outside the evaporation system by reducing the pressure in the evaporation system. The evaporated fuel treating unit of the third embodiment is shown in FIG. 10. The components described in the foregoing embodiments are denoted by the same reference symbols and descriptions will be focused on differences between the third embodiment and the foregoing embodiments.

The atmosphere passage 12 is provided with a pump 14A in place of the pump 14 in the first embodiment. The pump 14A is a motor-driven pump operated by the control of the ECU 18B. When the pump 14A is operated with the closed valve 13 opened, in contrast to the pump 14, it presses and discharges air from the canister 8 to the atmosphere. This reduces the pressure in the evaporation system and produces a pressure difference between inside the evaporation system and outside the evaporation system that is in the atmospheric pressure.

Figure 11:
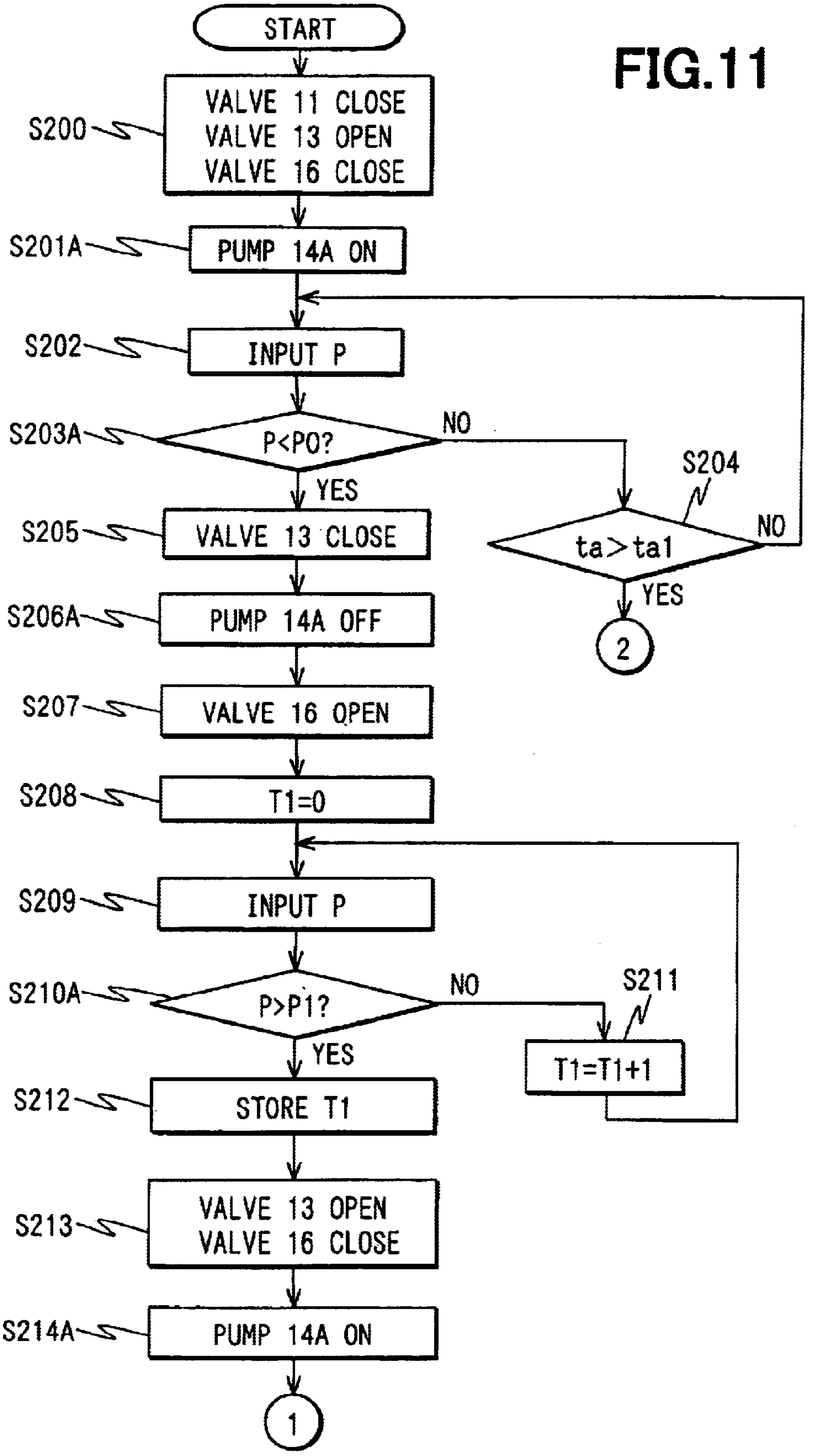
FIG. 11 is a flowchart in accordance with the third embodiment.
Figure 12:
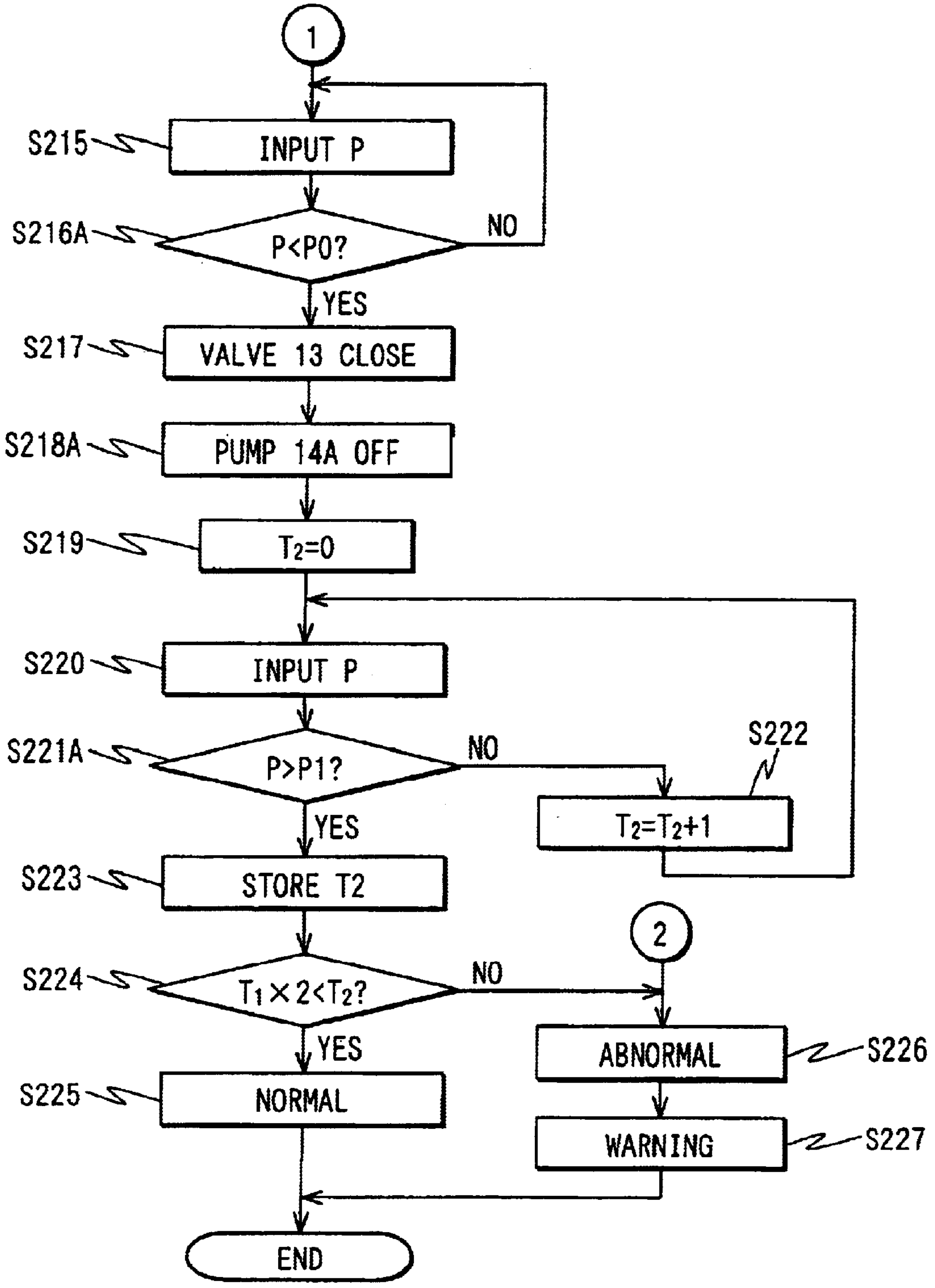
FIG. 12 is the flowchart in accordance with the third embodiment.
Figure 13:
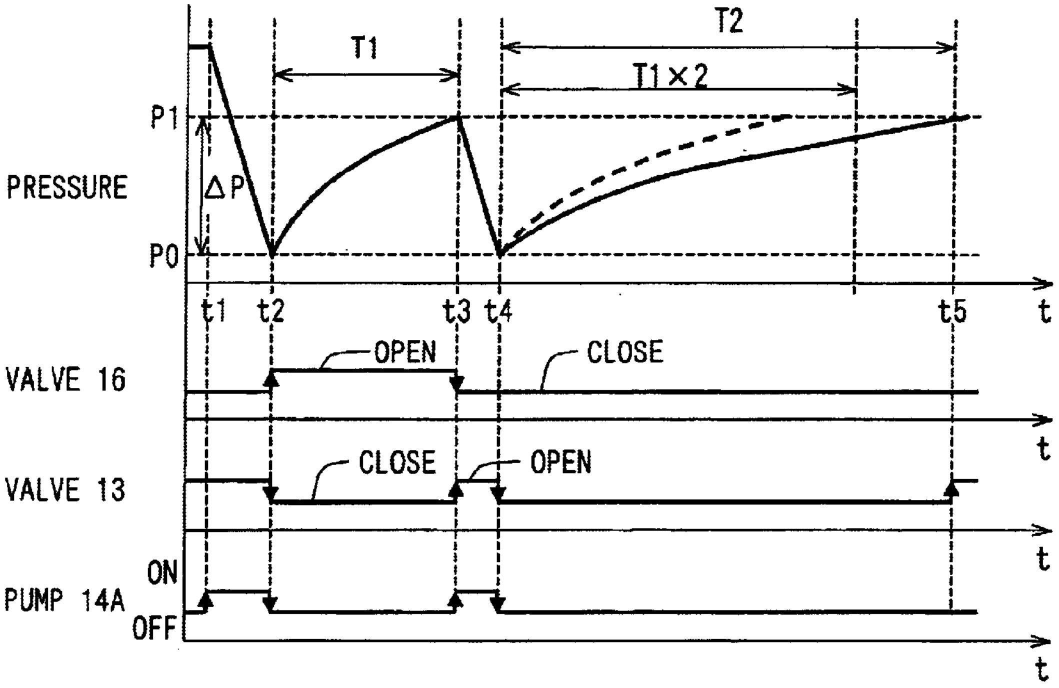
FIG. 13 is a timing chart in accordance with the second embodiment.

The procedures of the leak check performed by the ECU 18B are shown in FIG. 11 and FIG. 12. FIG. 13 shows the waveforms of parts in the leak check.

Steps from S200 to S212 are first measurement procedures. This is the first required time measuring means of the ECU 18B. These steps are nearly equal to those in the first embodiment. When the pump 14A is turned on (Step S201A), the pressure in the evaporation system starts to decrease. When the pressure reaches the first specified pressure P0 (Step S203A), the pump 14A is turned off (Step S206A). Here, the first specified pressure P0 is a pressure value set on a negative side. The second specified pressure P1 that will be described later is the same.

At Steps from S207 to S212, the state of change in pressure in a state where the base leak valve 16 is opened (Step S207) is measured. As to the state of change in pressure in this state, the pressure P in the evaporation system is negative and hence air flows into the evaporation system through the leak hole of the evaporation system and increases the pressure P toward the atmospheric pressure.

When the pressure P increases toward the second specified pressure P1 set previously closer to the atmospheric pressure and it is determined that P>P1 (Step S210A), a time required for the pressure P to increase from the first specified pressure P to the second specified pressure P1 is stored as a first required time T1 (Step S212).

Steps from S213 to S223 are second measurement procedures. This is the second required time measuring means of the ECU 18B. These steps are nearly equal to those in the first embodiment. When the pump 14A is turned on (Step S214A), the pressure in the evaporation system starts to decrease. When the pressure reaches the first specified pressure P0 (Step S216A), the pump 14A is turned off (Step S218A).

Then, at Steps from S217 to S223, the state of change in pressure in a state where the base leak valve 16 is closed (Step S217) is measured.

When the pressure P increases toward the second specified pressure P1 and it is determined that P>P1 (Step S221A), a time required for the pressure P to increase from the first specified pressure P0 to the second specified pressure P1 is stored as a second required time T2 (Step S212).

Steps from S224 to S227 are also performed in the same way as in the first embodiment and a determination as to whether a leak is caused or not is made.

Also in the third embodiment, as in the first embodiment, the Bernoulli's theorem holds true and hence the same determination principle is viable. Thus, by setting the coefficient by which the first required time T1 is multiplied when the determination base time is found based on the determination base value obtained by using the passage cross-sectional area of the base orifice 17 as a unit, it is possible to grasp the size of the leak hole as a failure by the magnitude of the coefficient and the comparison in magnitude between the second required time T2 and the determination base time. In this embodiment, air flows from outside the evaporation system into the evaporation system, so that even if a leak might occur in the evaporation system, the evaporated fuel is not discharged from the leak hole to the outside of the evaporation system when the leak check is performed.

Then, by setting the coefficient by which the required time T1 is multiplied at the ratio of the area of the leak hole at the time of the first measurement to the area of the leak hole at the time of the second measurement at the time when the area of the leak hole as a failure is the allowable upper limit value, it is possible to determine whether or not the area of the leak hole as a failure is smaller than the allowable upper limit value by the comparison in magnitude between the required time T2 and the determination base time. Thus, it is possible to set the determination base value regardless of the size of the base orifice 17.

Fourth Embodiment

Figure 14:
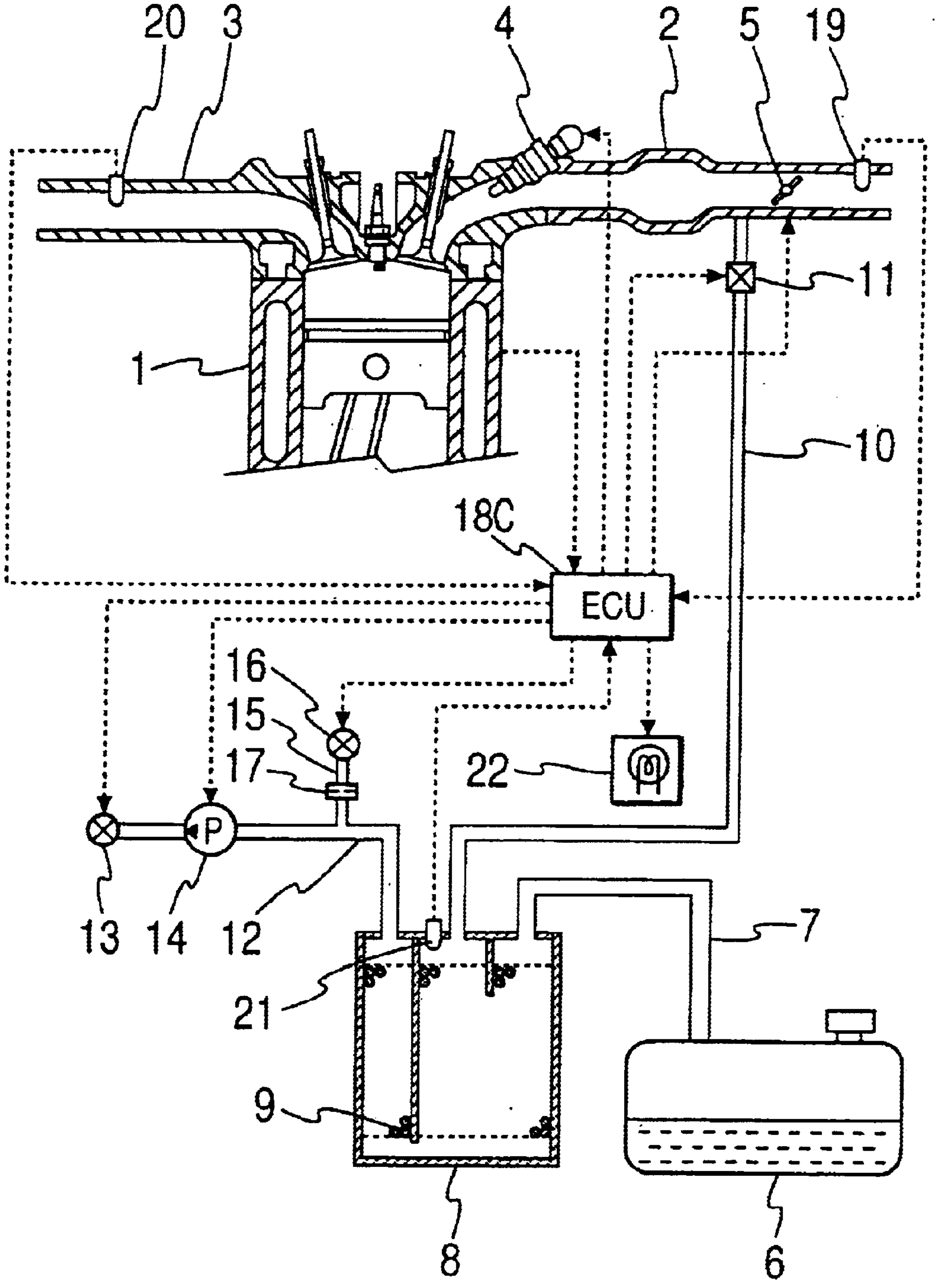
FIG. 14 is a block diagram showing the construction of an evaporated fuel treating unit in accordance with a fourth embodiment of the invention.

The evaporated fuel treating unit of a fourth embodiment is shown in FIG. 14. The fourth embodiment is a combination of the second embodiment and the third embodiment. The components described in the foregoing embodiments are denoted by the same reference symbols and descriptions will be focused on the difference between the fourth embodiment and the foregoing embodiments.

Figure 15:
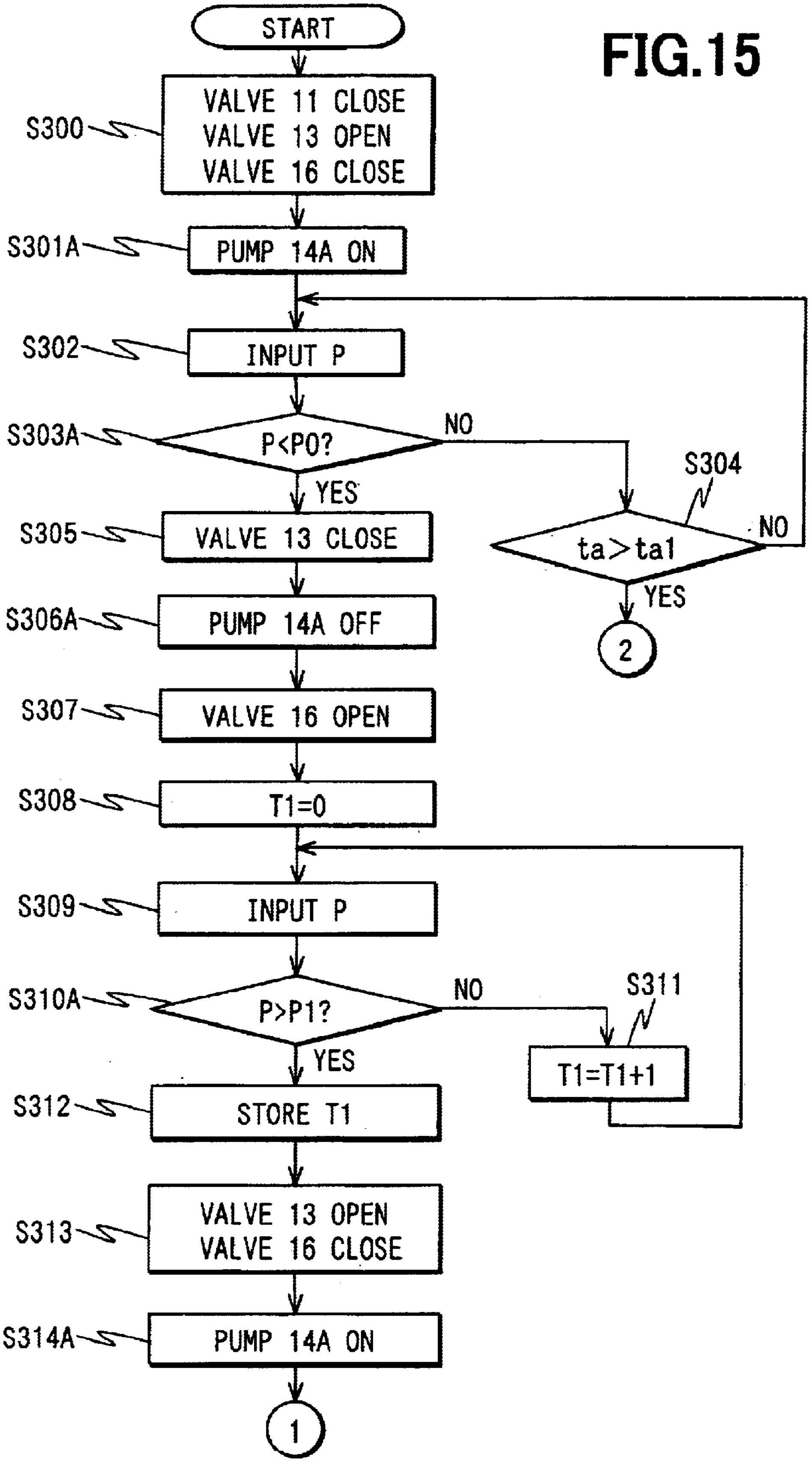
FIG. 15 is a flowchart in accordance with the fourth embodiment.
Figure 16:
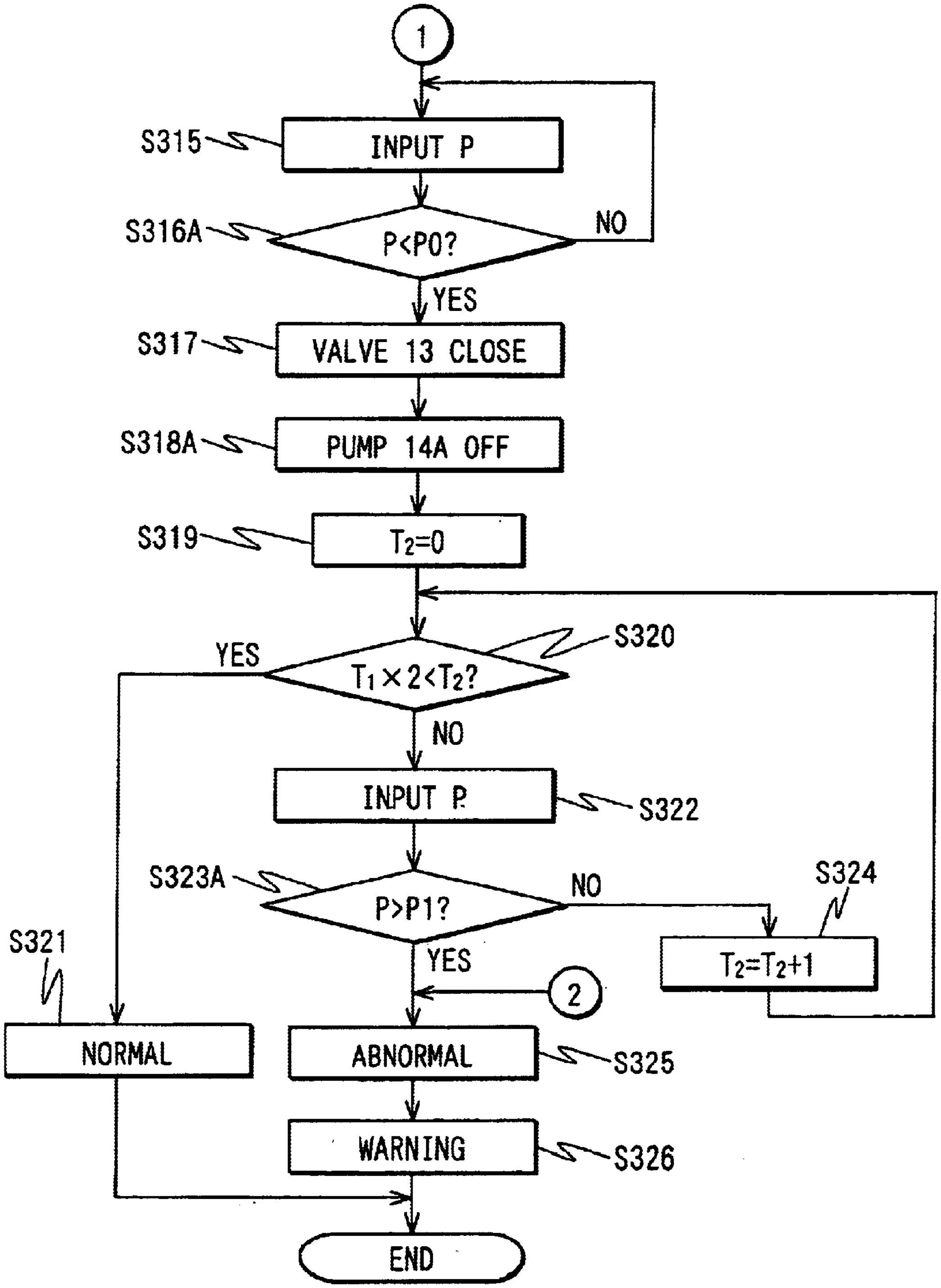
FIG. 16 is the flowchart in accordance with the fourth embodiment.
Figure 17:
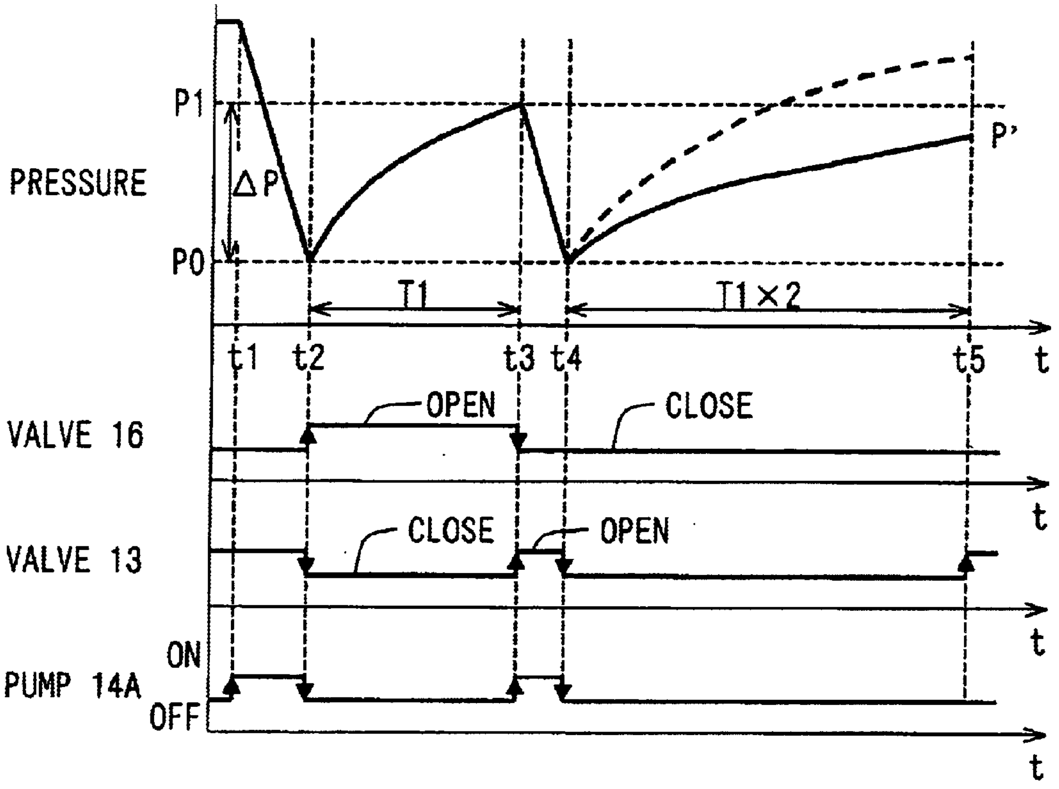
FIG. 17 is a timing chart in accordance with the fourth embodiment.

The procedures of the leak check performed by the ECU 18C are shown in FIG. 15 and FIG. 16. FIG. 17 shows the waveforms of parts in the leak check.

Steps from S300 to S312 are first measurement procedures. This is the required time measuring means of the ECU 18C. When the pump 14A is turned on (Step S301A), the pressure P in the evaporation system starts to decrease. When the pressure P reaches the first specified pressure P0 (Step S303A), the pump 14A is turned off (Step S306A).

At Steps from S307 to S312, the state of change in the pressure in a state where the base leak valve 16 is opened (Step S307) is measured.

When the pressure P increases toward the second specified pressure P1 set previously closer to the atmospheric pressure and it is determined that P>P1 (Step S310A), a time required for the pressure P to increase from the first specified pressure P0 to the second specified pressure P1 is stored as a required time T1 (Step S312).

Steps from S313 to S323 are second measurement procedures. This is means for measuring pressure reached of the ECU 18C. First, when the pump 14A is turned on (Step S314A), the pressure P in the evaporation system starts to decrease. When the pressure P reaches the first specified pressure P0 (Step S316A), the pump 14A is turned off (Step S318A).

Then, at Steps from S317 to S323, the state of change in the pressure in a state where the base leak valve 16 is closed (Step S317) is measured.

Then, at Step S323A, it is determined whether or not the pressure P in the evaporation system is larger than the second specified pressure P1, that is, P>P1 until the elapsed time T2 reaches the determination base time T1×2, and when it is determined that the pressure P in the evaporation system is larger than the second specified pressure P1, at Step S325, the leak of the evaporation system is diagnosed as being abnormal. When the elapsed time T2 reaches the determination base time T1×2 before the pressure P becomes larger than the second specified pressure P1 (Step S320), at Step S321, the leak of the evaporation system is diagnosed as being normal.

Also in the fourth embodiment, as in the second embodiment, the Bernoulli's theorem holds true and hence the same determination principle is viable. Thus, by setting the coefficient by which the required time T1 is multiplied when the determination base time is found based on the determination base value obtained by using the passage cross-sectional area of the base orifice 17 as a unit, it is possible to grasp the size of the leak hole as a failure by the magnitude of the coefficient and the comparison in magnitude between the pressure reached P' and the second specified pressure P1. In this embodiment, air flows from outside the evaporation system into the evaporation system, so that even if a leak might occur in the evaporation system, the evaporated fuel is not discharged from the leak hole to the outside of the evaporation system when the leak check is performed.

Then, by setting the coefficient by which the required time T1 is multiplied at the ratio of the area of the leak hole at the time of the first measurement to the area of the leak hole at the time of the second measurement at the time when the area of the leak hole as a failure is the allowable upper limit value, it is possible to determine whether or not the area of the leak hole as a failure is smaller than the allowable upper limit value by the comparison in magnitude between the pressure reached P1 and the second specified pressure P1. Thus, it is possible to set the determination base value regardless of the size of the base orifice 17.

Here, in the foregoing respective embodiments, the leak check is performed only when the engine is stopped, but it is also recommended that the leak check be performed during the operation of the engine. In this case, it is recommendable to perform the control shown in FIG. 18 in place of the control shown in FIG. 2. That is, when the leak check conditions are met at Step S401, the leak check is immediately performed at Step S402 in the same way as in the foregoing respective embodiments.

Further, in the foregoing respective embodiments, it is determined whether the state of leak of the evaporation system is normal or abnormal, that is, the state of leak of the evaporation system is determined by two steps. However, it is also recommendable to determine the state of leak of the evaporation system by a plurality of steps based on the ratio of the required time T2 in the first and third embodiments to the determination base time T1×2 or the ratio of the pressure reached P1 in the second and fourth embodiments to the specified pressure P1. Further, it is also recommended that in the first and third embodiments, a plurality of times obtained by multiplying the first required time T1 by a plurality of coefficients be set as a plurality of determination base times and a determination on the comparison between the second required time and the determination base time be performed for the respective determination base times (Step S224) and the degree of the leak be determined with higher accuracy by the value of the foregoing determination base time when the result of determination is reversed. Still further, it is also recommended that in the second and fourth embodiments, a plurality of times obtained by multiplying the required time T1 by a plurality of coefficients be set as a plurality of determination base times and a determination on the comparison between the pressure reached and the second specified pressure for the respective determination base times (Step S323) and the degree of the leak be determined with higher accuracy by the value of the foregoing determination base time when the result of determination is reversed.

Further, according to the specifications required, in place of the motor-driven pumps 14, 14A, it is possible to use a pump driven by the power of an engine.

Moreover, the specific specifications of the invention can be modified within the spirit and scope of the invention in addition to those described specifically.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A failure diagnosis method for diagnosing an evaporated fuel treating unit provided with a canister receiving an absorbent for absorbing evaporated fuel, a purge passage for introducing the evaporated fuel separated from the absorbent into an intake pipe of an internal combustion engine, and a purge control valve for controlling a flow rate of the evaporated fuel in the purge passage, the method comprising the steps of:

producing a pressure difference between inside an evaporation system including a fuel tank, the canister, the purge passage and the purge control valve and outside the evaporation system;

measuring a state of change in pressure in the evaporation system; and determining a state of leak in the evaporation system based on the measured state of change in pressure, wherein the step of measuring the state of change in pressure comprises:

a first measuring step comprising the steps of:

making a pressure in the evaporation system a first specified pressure;

opening a base leak hole; and measuring a first required time that is required for the pressure in the evaporation system to change from the first specified pressure to a second specified pressure set at a value closer to a pressure outside the evaporation system, and a second measuring step comprising the steps of:

making the pressure in the evaporation system the first specified pressure;

closing the base leak hole; and measuring a second required time that is required for the pressure in the evaporation system to change from the first specified pressure to the second specified pressure, and wherein the step of determining the state of leak in the evaporation system is performed by comparing the second required time with a determination base time obtained by multiplying the first required time by a coefficient set previously based on an area of the base leak hole.

2. The failure diagnosis method for diagnosing an evaporated fuel treating unit as claimed in claim 1, the coefficient is set at a ratio of a total area of a leak point at the first measuring step that includes the base leak hole and a leak hole as a failure to an area of the leak point at the second measuring step that includes only the leak hole as a failure at the time when the area of the leak hole as a failure is an allowable upper limit value.

3. The failure diagnosis method for diagnosing an evaporated fuel treating unit as claimed in claim 1, wherein the pressure difference is produced by increasing the pressure in the evaporation system and the state of change in pressure is a state of decrease in pressure.

4. The failure diagnosis method for diagnosing an evaporated fuel treating unit as claimed in claim 1, wherein the pressure difference is produced by decreasing the pressure in the evaporation system and the state of change in pressure is a state of increase in pressure.

5. A failure diagnosis method for diagnosing an evaporated fuel treating unit provided with a canister receiving an absorbent for absorbing evaporated fuel, a purge passage for introducing the evaporated fuel separated from the absorbent into an intake pipe of an internal combustion engine, and a purge control valve for controlling a flow rate of the evaporated fuel in the purge passage, the method comprising the steps of:

producing a pressure difference between inside an evaporation system including a fuel tank, the canister, the purge passage and the purge control valve and outside the evaporation system;

measuring a state of change in pressure in the evaporation system; and determining a state of leak in the evaporation system based on the measured state of change in pressure, wherein the step of measuring the state of change in pressure comprises:

a first measuring step comprising the steps of:

making a pressure in the evaporation system a first specified pressure;

opening a base leak hole; and measuring a required time that is required for the pressure in the evaporation system to change from the first specified pressure to a second specified pressure set at a value closer to a pressure outside the evaporation system than the first specified pressure, and a second measuring step comprising the steps of:

making the pressure in the evaporation system the first specified pressure;

closing the base leak hole; and measuring a pressure reached in the evaporation system when a determination base time obtained by multiplying the required time by a coefficient set previously based on an area of the base leak hole, and wherein the step of determining the state of leak in the evaporation system is performed by comparing the pressure reached with the second specified pressure.

6. The failure diagnosis method for diagnosing an evaporated fuel treating unit as claimed in claim 5, the coefficient is set at a ratio of a total area of a leak point at the first measuring step that includes the base leak hole and a leak hole as a failure to an area of a leak point at the second measuring step that includes only the leak hole as a failure at the time when an area of the leak hole as a failure is an allowable limit value.

7. The failure diagnosis method for diagnosing an evaporated fuel treating unit as claimed in claim 5, wherein the pressure difference is produced by increasing the pressure in the evaporation system and the state of change in pressure is a state of decrease in pressure.

8. The failure diagnosis method for diagnosing an evaporated fuel treating unit as claimed in claim 5, wherein the pressure difference is produced by decreasing the pressure in the evaporation system and the state of change in pressure is a state of increase in pressure.

9. A failure diagnosis device for diagnosing an evaporated fuel treating unit provided with a canister receiving an absorbent for absorbing evaporated fuel, a purge passage for introducing the evaporated fuel separated from the absorbent into an intake pipe of an internal combustion engine, and a purge control valve for controlling a flow rate of the evaporated fuel in the purge passage, the device comprising:

pressure difference producing means for producing a pressure difference between inside an evaporation system including a fuel tank, the canister, the purge passage and the purge control valve and outside the evaporation system;

pressure detecting means for detecting a pressure in the evaporation system;

a passage for making the evaporation system communicate with an atmosphere;

throttling means mounted in the passage and having a certain passage cross-sectional area;

a valve-for closing the passage;

first required time measuring means that controls the pressure difference producing means and the valve to make the pressure in the evaporation system a first specified pressure set previously, then opens the valve, and measures a first required time that is required for the pressure in the evaporation system to change from the first specified pressure to a second specified pressure set at a value closer to a pressure outside the evaporation system than the first specified pressure;

second required time measuring means that controls the pressure difference producing means and the valve to make the pressure in the evaporation system the first specified pressure, then closes the valve, and measures a second required time that is required for the pressure in the evaporation system to change from the first specified pressure to the second specified pressure; and determination means that determines a state of leak of the evaporation system by comparing the second required time with a determination base time obtained by multiplying the first required time by a coefficient set previously based on a passage cross-sectional area of the throttle means.

10. The failure diagnosis method for diagnosing an evaporated fuel treating unit as claimed in claim 9, the coefficient is set at a ratio of a total area of a leak point when the first required time is measured that includes the throttling means and a leak hole as a failure to an area of a leak point when the second required time is measured that includes only the leak hole as a failure at the time when an area of the leak hole as a failure is an allowable limit value.

* * * * *

UNITED STATES PATENT AND TRADEMARK OFFICE

CERTIFICATE OF CORRECTION

PATENT NO. : 6,817,232 B2 
DATED : November 16, 2004
INVENTOR(S) : Amano et al.

It is certified that error appears in the above-identified patent and that said Letters Patent is hereby corrected as shown below:

Column 21, line 43 - Column 24, line 38,
Claims 1-10, should be deleted and replaced with the following claims:

1. A failure diagnosis method for diagnosing an evaporated fuel treating unit provided with a canister receiving an absorbent for absorbing evaporated fuel, a purge passage for introducing the evaporated fuel separated from the absorbent into an intake pipe of an internal combustion engine, and a purge control valve for controlling a flow rate of the evaporated fuel in the purge passage, the method comprising the steps of:
producing a pressure difference between inside an evaporation system including a fuel tank, the canister, the purge passage and the purge control valve and outside the evaporation system;
measuring a state of change in pressure in the evaporation system; and
determining a state of leak in the evaporation system based on the measured state of change in pressure,
wherein the step of measuring the state of change in pressure comprises:
a first measuring step comprising the steps of:
making a pressure in the evaporation system a first specified pressure;
opening a base leak hole; and
measuring a required time that is required for the pressure in the evaporation system to change from the first specified pressure to a second specified pressure set at a value closer to a pressure outside the evaporation system than the first specified pressure, and
a second measuring step comprising the steps of:
making the pressure in the evaporation system the first specified pressure;
closing the base leak hole; and measuring a pressure reached in the evaporation system when a determination base time obtained by multiplying the required time by a coefficient set previously based on an area of the base leak hole, and
wherein the step of determining the state of leak in the evaporation system is performed by comparing the pressure reached with the second specified pressure.

2. The failure diagnosis method for diagnosing an evaporated fuel treating unit as claimed in claim 1, the coefficient is set at a ratio of a total area of a leak point at the first measuring step that includes the base leak hole and a leak hole as a failure to an area of a leak point at the second measuring step that includes only the leak hole as a failure at the time when an area of the leak hole as a failure is an allowable limit value.

CERTIFICATE OF CORRECTION

PATENT NO. : 6,817,232 B2
DATED : November 16, 2004
INVENTOR(S) : Amano et al.

It is certified that error appears in the above-identified patent and that said Letters Patent is hereby corrected as shown below:

Column 21, line 43 - Column 24, line 38 (cont'd),

3. The failure diagnosis method for diagnosing an evaporated fuel treating unit as claimed in claim 1, wherein the pressure difference is produced by increasing the pressure in the evaporation system and the state of change in pressure is a state of decrease in pressure.

4. The failure diagnosis method for diagnosing an evaporated fuel treating unit as claimed in claim 1, wherein the pressure difference is produced by decreasing the pressure in the evaporation system and the state of change in pressure is a state of increase in pressure.

5. A failure diagnosis device for diagnosing an evaporated fuel treating unit provided with a canister receiving an absorbent for absorbing evaporated fuel, a purge passage for introducing the evaporated fuel separated from the absorbent into an intake pipe of an internal combustion engine, and a purge control valve for controlling a flow rate of the evaporated fuel in the purge passage, the device comprising:

pressure difference producing means for producing a pressure difference between inside an evaporation system including a fuel tank, the canister, the purge passage and the purge control valve and outside the evaporation system;

pressure detecting means for detecting a pressure in the evaporation system; a passage for making the evaporation system communicate with an atmosphere;

throttling means mounted in the passage and having a certain passage cross-sectional area;

a valve for closing the passage;

required time measuring means that controls the pressure difference producing means and the valve to make the pressure in the evaporation system a first specified pressure set previously, then opens the valve, and measures a required time that is required for the pressure in the evaporation system to change from the first specified pressure to a second specified pressure set at a value closer to a pressure outside the evaporation system than the first specified pressure;

pressure reached measuring means that controls the pressure difference producing means to make the pressure in the evaporation system the first specified pressure, then closes the valve, and measures a pressure reached in the evaporation system when a determination base time elapses that is obtained by multiplying the required time by a coefficient set previously based on a passage cross-sectional area of the throttle means; and determination means that determines a state of leak of the evaporation system by comparing the pressure reached with the second specified pressure.

UNITED STATES PATENT AND TRADEMARK OFFICE

CERTIFICATE OF CORRECTION

PATENT NO. : 6,817,232 B2
DATED : November 16, 2004
INVENTOR(S) : Amano et al.

It is certified that error appears in the above-identified patent and that said Letters Patent is hereby corrected as shown below:

Column 21, line 43 - Column 24, line 38 (cont'd),

6. The failure diagnosis method for diagnosing an evaporated fuel treating unit as claimed in claim 5, the coefficient is set at a ratio of a total area of a leak point when the required time is measured that includes the throttle means and a leak hole as a failure to an area of a leak point when the pressure reached is measured that includes only the leak hole as a failure at the time when the leak hole as a failure is an allowable limit value.

7. The failure diagnosis device for diagnosing an evaporated fuel treating unit as claimed in claim 5, wherein the pressure difference producing means is means for increasing the pressure in the evaporation system and the state of change in pressure is a state of decrease in pressure.

8. The failure diagnosis device for diagnosing an evaporated fuel treating unit as claimed in claim 5, wherein the pressure difference producing means is means for decreasing the pressure in the evaporation system and the state of change in pressure is a state of increase in pressure.

9. The failure diagnosis device for diagnosing an evaporated fuel treating unit as claimed in claim 5, wherein the pressure difference producing means is constructed by a motor-driven pump.

10. The failure diagnosis device for diagnosing an evaporated fuel treating unit as claimed in claim 9, further comprising prohibition means that determines whether or not the internal combustion engine is in a state of operation and when it is in the state of operation, prohibits operations of the required time measuring means and the pressure reached measuring means.

---

Signed and Sealed this

Twenty-third Day of August, 2005

JON W. DUDAS

*Director of the United States Patent and Trademark Office*

UNITED STATES PATENT AND TRADEMARK OFFICE

CERTIFICATE OF CORRECTION

PATENT NO. : 6,817,232 B2
DATED : November 16, 2004
INVENTOR(S) : Amano et al.

It is certified that error appears in the above-identified patent and that said Letters Patent is hereby corrected as shown below:

The title page should be deleted and replaced with the attached title page.

Delete the specification and replace it with the attached specification.

Signed and Sealed this

Seventh Day of February, 2006

JON W. DUDAS
*Director of the United States Patent and Trademark Office*

(12) United States Patent
Amano et al.

(10) Patent No.: US 6,817,232 B2
(45) Date of Patent: Nov. 16, 2004

(54) FAILURE DIAGNOSIS METHOD AND FAILURE DIAGNOSIS DEVICE OF EVAPORATED FUEL TREATING UNIT

(75) Inventors: Noriyasu Amano, Gamagori (JP); Hideaki Itakura, Nagoya (JP); Naoya Kato, Ama-gun (JP); Masao Kano, Gamagori (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 10/408,100

(22) Filed: Apr. 8, 2003

(65) Prior Publication Data

US 2003/0192370 A1 Oct. 16, 2003

(30) Foreign Application Priority Data

Apr. 11, 2002 (JP) ....................................... 2002-109172
Jan. 31, 2003 (JP) ....................................... 2003/024353

(51) Int. Cl.[7] ............................................. G01M 15/00
(52) U.S. Cl. ....................................... 73/118.1; 73/49.7
(58) Field of Search ............................... 73/40, 46, 47, 73/49.7, 112, 115, 116, 117.2, 117.3, 118.1, 119 R

(56) References Cited

U.S. PATENT DOCUMENTS 5,146,902 A 9/1992 Cook et al.
5,575,265 A 11/1996 Kurihara et al.
5,890,474 A 4/1999 Schnaibel et al.
6,164,123 A * 12/2000 Corkill ........................ 73/49.7
6,257,050 B1 * 7/2001 Nagano et al. ................ 73/47
6,308,119 B1 * 10/2001 Majkowski et al. .......... 701/29
6,382,017 B1 * 5/2002 Majkowski et al. ......... 73/49.7
6,640,620 B2 * 11/2003 Cook et al. ................ 73/118.1
6,666,072 B2 * 12/2003 Hirano et al. ................ 73/49.7
6,738,709 B2 * 5/2004 Saito et al. ................. 701/114
2001/0008136 A1 * 7/2001 Kitamura et al. ........... 123/516
2002/0026826 A1 * 3/2002 Cook et al. ................ 73/118.1
2002/0129643 A1 * 9/2002 Yamaguchi et al. ......... 73/49.7
2002/0189328 A1 * 12/2002 Saito et al. .................. 73/49.7
2003/0061871 A1 * 4/2003 Oki et al. .................. 73/118.1
2003/0084711 A1 * 5/2003 Kano et al. ................ 73/118.1
2003/0110836 A1 * 6/2003 Cho ........................... 73/40.7
2003/0154770 A1 * 8/2003 Steckler et al. .............. 73/49.7
2003/0172912 A1 * 9/2003 Kanai et al. ................ 123/520
2003/0196482 A1 * 10/2003 Kanai et al. ............... 73/118.1

FOREIGN PATENT DOCUMENTS

JP 11-351078 * 12/1999

* cited by examiner

*Primary Examiner*—Eric S. McCall
(74) *Attorney, Agent, or Firm*—Nixon & Vanderhye P.C.

(57) ABSTRACT

An apparatus detects leak in a fuel vapor treatment system which is referred to as an evaporation system. The apparatus measures a required time T2 that is required for decreasing pressure in the evaporation system from P0 to P1 while opening a base leak hole that provides known amount of leak. Then, a required time T1 that is required for decreasing pressure from P0 to P1 is measured while closing the base leak hole. The apparatus compares the required times T1 and T2 in order to detect a leak other than the base leak hole. In this process, a specified coefficient that is defined in accordance with the base leak hole is taken into consideration. It is possible to detect the leak of the evaporation system with high accuracy even when the amount of remaining fuel is extremely large.

10 Claims, 18 Drawing Sheets

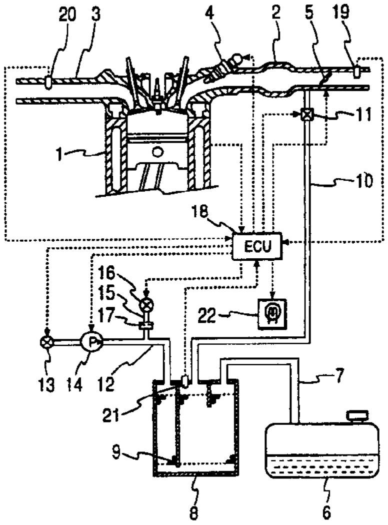

FAILURE DIAGNOSIS METHOD AND FAILURE DIAGNOSIS DEVICE OF EVAPORATED FUEL TREATING UNIT

CROSS REFERENCE TO RELATED APPLICATIONS

This application is based on Japanese Patent Applications No. 2002-109172 filed on Apr. 11, 2002 and No. 2003-24353 filed on Jan. 31, 2003 the contents of which are incorporated herein by reference.

BACKGROUND OF THE INVENTION

1. Field of the Invention

The present invention relates to a failure diagnosis method and failure diagnosis device for an evaporated fuel treating unit and in particular, to a technology for making a determination on the leak of fuel vapor.

2. Description of Related Art

The evaporated fuel treating unit is a unit for preventing evaporated fuel produced in a fuel tank from being discharged into the atmosphere. A combined body of structural members including the fuel tank, a canister, a purge passage, and a purge control valve forms a closed space when the foregoing purge control valve is closed. This closed space is called an evaporation system. It is desired to mount a failure diagnosis device for determining whether or not evaporated fuel leaks from the evaporation system. Hereinafter, the failure diagnosis device and it's function may be referred to as leak check.

JP-A-5-272417, and U.S. Pat. No. 5,146,902 discloses a method in which pressure in the evaporation system is increased by a pump and then the state of decrease in the pressure in the evaporation system is measured at a specified time set previously to determine the state of leak. However, according to this method, the volume of a space to be pressurized is varied by the amount of remaining fuel and hence the rate of decrease in the pressure is also varied, so that it is possible to detect whether or not leak occurs but impossible to correctly detect the magnitude of the leak. Further, since the state of decrease in the pressure is varied also by differences in the atmospheric temperature and the properties of the fuel, it is impossible to determine the state of the leak sufficiently correctly if no correction is made. For example, the atmospheric temperature and the properties of the fuel affect the amount of evaporated fuel at a certain temperature. In order to grasp the state of the leak correctly, it is thought to correct the state of the leak by parameters affecting the determination such as the amount of remaining fuel but this makes the determination complex and hence increases cost. On the other hand, if stricter conditions for allowing the leak check are become stricter, it is impossible to achieve an essential object of ensuring the frequency of determinations.

On the other hand, JP-A-10-90107 discloses a method in which a pump is driven until operating characteristic values such as current, voltage, the number of revolutions are saturated and the saturated operating characteristic values are compared with the base values to determine the state of leak. However, according to this method, the pump is driven until the operating characteristic values are saturated and hence time to drive a pump is elongated, which degrades fuel consumption. Moreover, it is necessary to use a long-life pump or to increase the frequency of replacements of the pump and hence to increase cost.

Figure 19:
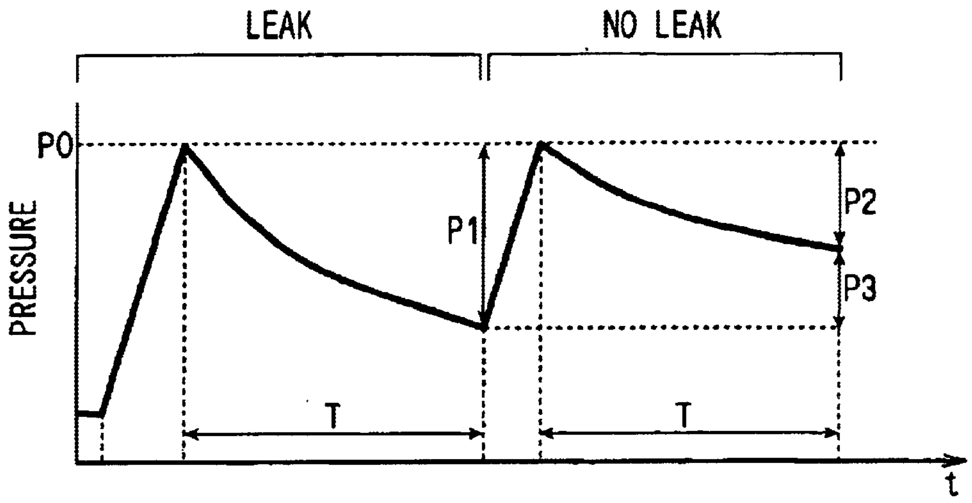
FIG. 19 (PRIOR ART)
FIG. 19 is a timing chart showing a failure diagnosis technique according to a related art.

Still further, JP-A-11-351078 discloses a method of using a base orifice. Variations in pressure in the evaporation system in this technology are shown in FIG. 19. The state of decrease in the pressure in the evaporation system from the time when the pressure is increased to a specified pressure P0 to the time when a previously set time T elapses is measured in a case where leak occurs at an orifice as a base leak point and in a case where leak does not occur. The pressure changing state may be measured as pressure differences P1, and P2. The amount of change in the pressure P2 caused by a leak hole as a failure is compared with the amount of change in the pressure P3=P1−P2 caused by the orifice as the base leak hole thereby to cancel effects produced by the amount of remaining fuel, atmospheric temperature, fuel properties, and the like.

Figure 20:
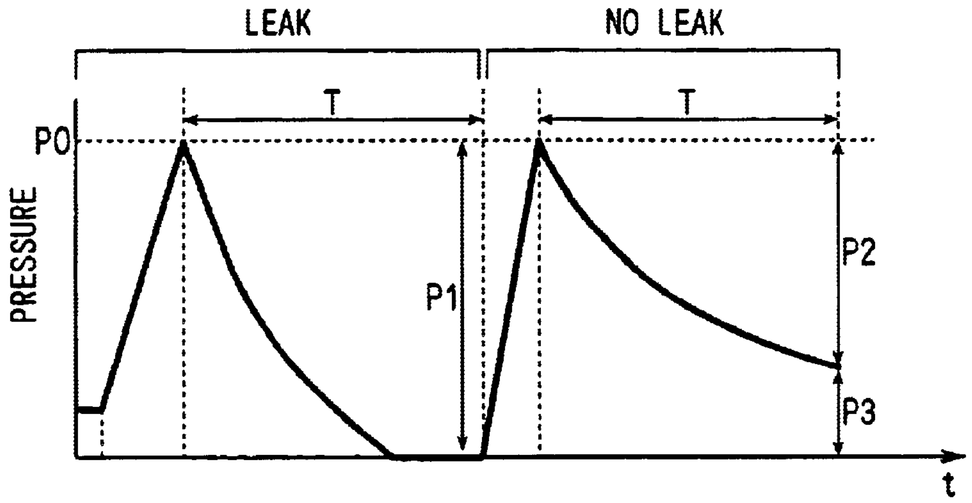
FIG. 20 (PRIOR ART)
FIG. 20 is a timing chart showing a failure diagnosis technique according to a related art.

However, in this method, when the amount of remaining fuel is extremely large, that is, the volume of the space to be pressurized is extremely small, as shown in FIG. 20, the rate of decrease in the pressure is increased to make the pressure zero, atmospheric pressure, that is equal to the pressure outside the evaporation system before the foregoing time T elapses. This is not the proper amount of change in pressure. On the other hand, when the amount of remaining fuel is small, the rate of decrease in the pressure is decreased to make it impossible to produce the sufficient amounts of change in pressure P1, P2 and hence to produce a sufficient detection accuracy. For this reason, there is a fear that correct determination can not be made on the state of leak. If the pressure in the evaporation system is sufficiently increased, the state of leak can be correctly determined but there are raised a problem that a fuel tank and the like need to have sufficient resistance to pressure and a problem that the capacity of a pump for increasing pressure needs to be increased. These problems can not be easily solved.

Still further, JP-A-11-351078 discloses a method of measuring time required for the pressure in the evaporation system to decrease by a specified amount of pressure drop. The measurement of time can be easily performed with higher accuracy than the detection of pressure. However, the determination method based on the amount of changes in the pressure P1, P2 can not be used for the determination based on the required time. For this reason, in order to put the method of leak check utilizing the required time into practical use, some improvements need to be made that are not disclosed in JP-A-11-351078.

The present invention has been made in view of the above circumstances. It is the object of the invention to provide a failure diagnosis method and a failure diagnosis device of an evaporated fuel treating unit by which a correct leak check can be performed regardless of the amount of remaining fuel and practically.

SUMMARY OF THE INVENTION

In accordance with the first aspect of the invention, there is provided a failure diagnosis method for diagnosing an evaporated fuel treating unit, which comprises the steps of: producing a pressure difference between inside an evaporation system having a fuel tank, the canister, the purge passage and the purge control valve and outside the evaporation system; measuring the state of change in pressure in the evaporation system; and determining the state of leak in the evaporation system based on the measured state of change in pressure.

In the method: a pressure in the evaporation system is made a first specified pressure, then a base leak hole is opened, and a first required time is measured that is required for the pressure in the evaporation system to change from the first specified pressure to a second specified pressure set at a value closer to a pressure outside the evaporation system in a state where leak occurs at the base leak hole and a leak hole as a failure;

the pressure in the evaporation system is made the first specified pressure, then the base leak hole is closed, and a second required time is measured that is required for the pressure in the evaporation system to change from the first specified pressure to the second specified pressure in a state where leak occurs only at the leak hole as a failure; and the state of the leak in the evaporation system is determined by comparing the second required time with a determination base time obtained by multiplying the first required time by a coefficient set previously based on the area of the base leak hole.

In the first measurement of the first required time, the leak points of the evaporation system are the leak hole as a failure and the base leak hole and in the second measurement of the second required time, the leak point is only the leak hole as a failure. Thus, the required time that is required for the pressure in the evaporation system to change from the first specified pressure to the second specified pressure is larger at the time of the second measurement in which the area of the leak point is smaller. According to the Bernoulli's theorem, the velocity of flow of gas at the leak point is equal if the pressure in the evaporation system is equal. Thus, the ratio of the foregoing second required time to the foregoing first required time is equal to the ratio of the area of the leak points at the time of the first measurement to the area of the leak point at the time of the second measurement.

Here, the ratio of the area of the leak points at the time of the first measurement to the area of the leak point at the time of the second measurement depends on the ratio of the area of the leak hole as a failure to the area of the base leak hole which causes leak only at the time of the first measurement.

Thus, by setting the foregoing coefficient on the basis of the area of the base leak hole and comparing the foregoing second required time with the foregoing determination base time obtained by multiplying the foregoing first required time by the above coefficient, it is possible to grasp the size of the leak hole as a failure on the basis of the magnitude of the above coefficient and the comparison in magnitude between the first required time and the second required time. In this manner, it is possible to practically determine the state of leak.

At the time of the first measurement and at the time of the second measurement, the amount of remaining fuel is not changed and hence the evaporation system is substantially equivalent, so it is possible to make a correct determination on the state of leak.

Further, in both of the first measurement and the second measurement, an initial pressure and a final pressure are specified pressures set previously, so even when the amount of remaining fuel is large and hence the volume of a space is small to which a pressure difference is applied, it is possible to correctly measure the state of change in pressure. Its effect is only to elongate the required time that is required for the pressure in the evaporation system to change from the first specified pressure to the second specified pressure. Thus, it is possible to substantially relax conditions allowing a proper leak check and to increase the frequency of determinations and to make a correct determination on the state of leak.

It is also recommended that the foregoing coefficient be set at the ratio of the total area of the leak points at the time of the first measurement that include the base leak hole and a leak hole as a failure to the area of the leak point at the time of the second measurement that includes only the leak hole as a failure at the time when the area of the leak hole as a failure is an allowable upper limit value.

The ratio of the foregoing second required time to the foregoing first required time is equal to the ratio of the area of the leak points at the time of the first measurement to the area of the leak point at the time of the second measurement. Here, if the foregoing coefficient is set at the ratio of the area of the leak points at the time of the first measurement to the area of the leak point at the time of the second measurement at the time when the area of the leak hole as a failure is the allowable upper limit value, it is possible to determine whether or not the area of the leak hole as a failure is smaller than its allowable upper limit value by whether or not the second required time is larger than the determination base time.

For example, if the allowable upper limit value of the area of the leak hole as a failure is the area of the base leak hole, in a case where the area of the leak hole as a failure is the allowable upper limit value, the ratio of the area of the leak points at the time of the first measurement to the area of the leak point at the time of the second measurement is two. Assuming that the coefficient is 2 by which the foregoing required time is multiplied when the determination base time is found, it is possible to determine that if the foregoing second required time is longer than the determination base time, the area of the leak hole as a failure is smaller than the allowable upper limit value and if the foregoing second required time is shorter than the determination base time, the area of the leak hole as a failure is larger than the allowable upper limit value.

In accordance with the second aspect of the invention, the pressure in the evaporation system is made the first specified pressure set previously, then the base leak hole is opened, and a required time is measured that is required for the pressure in the evaporation system to change from the first specified pressure to the second specified pressure set previously at a value closer to a pressure outside the evaporation system than the first specified pressure in a state where leak occurs at the base leak hole;

the pressure in the evaporation system is made the first specified pressure, then the foregoing base leak hole is closed, and a pressure reached in the evaporation system is measured when a determination base time obtained by multiplying the required time by a coefficient set previously based on the area of the base leak hole; and the state of the leak in the evaporation system is determined by comparing the pressure reached with the second specified pressure.

In the first measurement of the first required time, the leak points in the evaporation system are the leak hole as a failure and the base leak hole and in the second measurement of the second required time, the leak point is only the leak hole as a failure. Thus, the rate of change in the pressure in the evaporation system is smaller at the time of the second measurement in which the area of the leak point is smaller. According to the Bernoulli's theorem, the velocity of flow of gas at the leak point is equal if the pressure in the evaporation system is equal. Thus, when a time elapsing during a time period in which the pressure in the evaporation system changes from the same initial pressure to the same pressure is compared between the first measurement and the second measurement, the ratio of the time elapsing at the time of the second measurement to the time elapsing at the time of the first measurement is equal to the area of the leak points at the time of the first measurement to the area of the leak point at the time of the second measurement.

Here, the ratio of the area of the leak points at the time of the first measurement to the area of the leak point at the time of the second measurement depends on the ratio of the area of the leak hole as a failure to the area of the base leak hole which causes leak only at the time of the first measurement.

Thus, by setting the foregoing coefficient on the basis of the area of the base leak hole and comparing the foregoing pressure reached with the second specified pressure when the determination base time obtained by multiplying the foregoing required time by the above coefficient elapses in the second measurement, it is possible to grasp the size of the leak hole as a failure on the basis of the magnitude of the above coefficient and the comparison in magnitude between the foregoing pressure reached and the second specified pressure. In this manner, it is possible to practically determine the state of the leak.

At the time of the first measurement and at the time of the second measurement, the amount of remaining fuel is not changed and hence the evaporation system is substantially equivalent, so it is possible to make a correct determination on the state of the leak. Here, for example, when it is assumed that the coefficient is 2 by which the foregoing required time is multiplied when the determination base time is found, it is possible to determine that as the foregoing pressure reached has larger allowance for the second specified pressure, the leak hole as a failure becomes smaller in size than the base leak hole, and that as the foregoing pressure reached is larger than the second specified pressure, the leak hole as a failure is larger in size than the base leak hole.

Further, the rate of change in pressure in the second measurement is not so large as in the first measurement because only the leak hole as a failure causes the leak. Thus, if the foregoing coefficient is properly selected, even if the amount of remaining fuel is large and hence the volume of the space is small to which the pressure difference is applied, the pressure reached is not changed to the pressure outside the evaporation system. Moreover, as described above, since the rate of change in pressure is smaller in the second measurement than in the first measurement, it is easy to set the determination base time in such as way that the pressure reached does not become the pressure outside the evaporation system. Moreover, since the second measurement is finished regardless of the amount of leak at the time when the determination base time is reached, there is not presented a problem that as the amount of leak is smaller, a time period required to finish the measurement becomes longer, as is the invention claimed in claim 1. That is, a time period is not much varied that is required to perform the leak check. Thus, this can greatly relax conditions allowing the leak check and increase the frequency of determinations.

Here, in a case where the leak hole as a failure is so large that the quantitative estimation of leak is not required, needless to say, it is not always necessary to have allowance for the pressure outside the evaporation system when the determination base time elapses in the second measurement and it is recommendable to determine that the amount of leak is large when the pressure reaches a specified threshold within the determination base time.

It is recommended that the foregoing coefficient be set at the ratio of the total area of the leak points at the time of the first measurement that includes the base leak hole and the leak hole as a failure to the area of the leak point at the time of the second measurement that includes only the leak hole as a failure at the time when the area of the leak hole as a failure is an allowable upper limit value.

When the pressure in the evaporation system is changed to the second specified pressure in the second measurement and the time that elapses during an interval that the pressure in the evaporation system changes from the first specified pressure to the second specified pressure is compared between the second measurement and the first measurement, the ratio of the elapsed time at the time of the second measurement to the elapsed time at the time of the first measurement is equal to the ratio of the area of the leak points at the time of the first measurement to the area of the leak point at the time of the second measurement. Here, if the foregoing coefficient is set at the ratio of the area of the leak points at the time of the first measurement to the area of the leak point at the time of the second measurement at the time when the area of the leak hole as a failure is the allowable upper limit value, it is possible to determine whether or not the area of the leak hole as a failure is smaller than the allowable upper limit value by whether or not the pressure reached when the elapsed time at the time of the second measurement reaches the determination base time reaches the second specified pressure.

For example, if the allowable upper limit value of the area of the leak hole as a failure is the area of the base leak hole, in a case where the area of the leak hole as a failure is the allowable upper limit value, the ratio of the area of the leak points at the time of the first measurement to the area of the leak point at the time of the second measurement is two. Assuming that the coefficient is 2 by which the foregoing required time is multiplied when the determination base time is found, it is possible to determine that if the pressure reached does not reaches the second specified pressure, the area of the leak hole as a failure is smaller than the foregoing allowable upper limit value and if the foregoing pressure reached is larger than the second specified pressure, the area of the leak hole as a failure is larger than the allowable upper limit value.

It is also recommended that the pressure difference be produced by increasing the pressure in the evaporation system to make the state of change in pressure the state of decrease in pressure.

It is also recommended that the pressure difference be produced by decreasing the pressure in the evaporation system to make the state of change in pressure the state of increase in pressure.

In accordance with the third aspect of the invention, there is provided a failure diagnosis device for diagnosing an evaporated fuel treating unit, which comprises:

a passage for making the evaporation system communicate with an atmosphere;

throttling means mounted in the passage and having a certain passage cross-sectional area;

a valve for closing the passage;

first required time measuring means that controls the pressure difference producing means and the valve to make the pressure in the evaporation system a first specified pressure set previously, then opens the valve, and measures a first required time that is required for the pressure in the evaporation system to change from the first specified pressure to a second specified pressure set at a value closer to a pressure outside the evaporation system than the first specified pressure;

second required time measuring means that controls the pressure difference producing means and the valve to make the pressure in the evaporation system the first specified pressure, then closes the valve, and measures a second required time that is required for the pressure in the evaporation system to change from the first specified pressure to the second specified pressure; and determination means that determines the state of leak of the evaporation system by comparing the second required time with a determination base time obtained by multiplying the first required time by a coefficient set previously based on the passage cross-sectional area of the throttle means.

According to this aspect, it is possible to practically and correctly determine the state of leak and further to substantially relax conditions allowing a proper leak check and to increase the frequency of determinations.

It is also recommended that the foregoing coefficient be set at the ratio of the total area of leak points when the first required time is measured which includes the throttling means and a leak hole as a failure to the area of the leak point when the second required time is measured which includes only the leak hole as a failure at the time when the area of the leak hole as a failure is an allowable upper limit value.

In accordance with the fourth aspect of the invention, there is provided a failure diagnosis device for diagnosing the evaporated fuel treating unit, which comprises:

the passage for making the evaporation system communicate with an atmosphere;

the throttling means mounted in the passage and having a certain passage cross-sectional area;

the valve for closing the passage;

required time measuring means that controls the pressure difference producing means and the valve to make the pressure in the evaporation system the first specified pressure set previously, then opens the valve, and measures a required time that is for the pressure in the evaporation system to change from the first specified pressure to the second specified pressure set previously at the value closer to the pressure outside the evaporation system than the first specified pressure;

pressure reached measuring means that controls the pressure difference producing means to make the pressure in the evaporation system the first specified pressure, then closes the valve, and measures pressure reached in the evaporation system when a determination base time elapses that is obtained by multiplying the required time by a coefficient set previously based on the passage cross-sectional area of the throttle means; and determination means that determines the state of leak of the evaporation system by comparing the pressure reached with the second specified pressure.

According to this aspect, it is possible to practically and correctly determine the state of leak and further to substantially relax conditions allowing the proper leak check and to increase the frequency of determinations.

Here, in a case where the leak hole as a failure is so large that the quantitative estimation of leak is not required, needless to say, it is not always necessary to have allowance for the pressure outside the evaporation system when the determination base time elapses in the measurement of the pressure reached and it is recommendable to determine that the amount of leak is large when the pressure reaches a specified threshold within the determination base time.

It is also recommended that the foregoing coefficient be set at the ratio of the total area of the leak points when the foregoing required time is measured which includes the throttle means and the leak hole as a failure to the area of the leak point when the pressure reached is measured which includes only the leak hole as a failure at the time when the area of the leak hole as a failure is the allowable upper limit value.

It is also recommended that the foregoing pressure difference producing means be so constructed as to be means for increasing the pressure in the evaporation system to make the state of change in pressure the state of decrease in pressure.

It is also recommended that the foregoing pressure difference producing means be so constructed as to be means for decreasing the pressure in the evaporation system to make the state of change in pressure the state of increase in pressure.

It is also recommended that the foregoing pressure difference producing means be constructed by a motor-driven pump. In this case, the pump can be operated without the power of the internal combustion engine, so even when the engine is stopped, it is possible to perform the leak check and hence to increase the frequency of determinations.

It is also recommended that the failure diagnosis device further includes prohibition means that determines whether or not the internal combustion engine is in the state of operation and when it is in the state of operation, prohibits operations of the required time measuring means and the pressure reached measuring means.

During the operation of the internal engine, sometimes, the fuel is shaken by vibration to be abruptly evaporated and a fuel pump arranged in the fuel tank is heated to produce a sudden change in temperature. For this reason, there is a fear that a correct determination on the state of leak could not be preformed. According to the prohibition means, it is possible to eliminate the causes of error of determination and to perform the leak check correctly.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 1 is a block diagram showing the construction of an evaporated fuel treating unit in accordance with a first embodiment of the invention.

FIG. 2 is a flowchart in accordance with the first embodiment.

FIG. 3 is the flowchart in accordance with the first embodiment.

FIG. 4 is the flowchart in accordance with the first embodiment.

Figure 5:
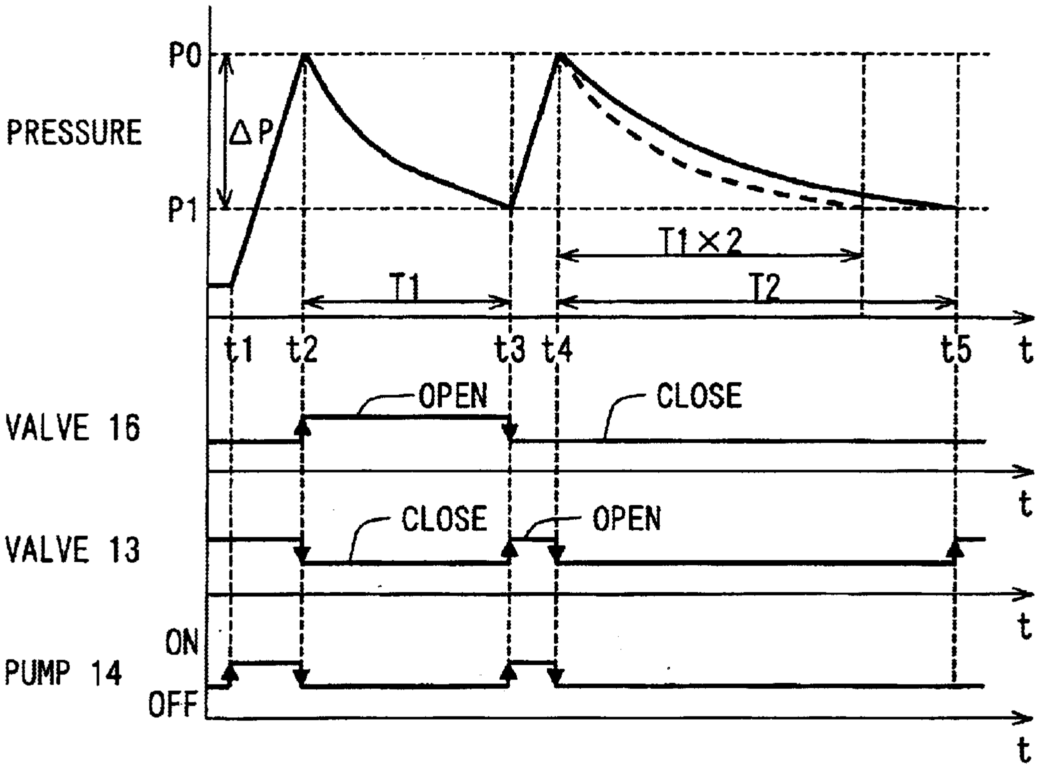
FIG. 5 is a timing chart in accordance with the first embodiment.

FIG. 5 is a timing chart in accordance with the first embodiment.

Figure 6:
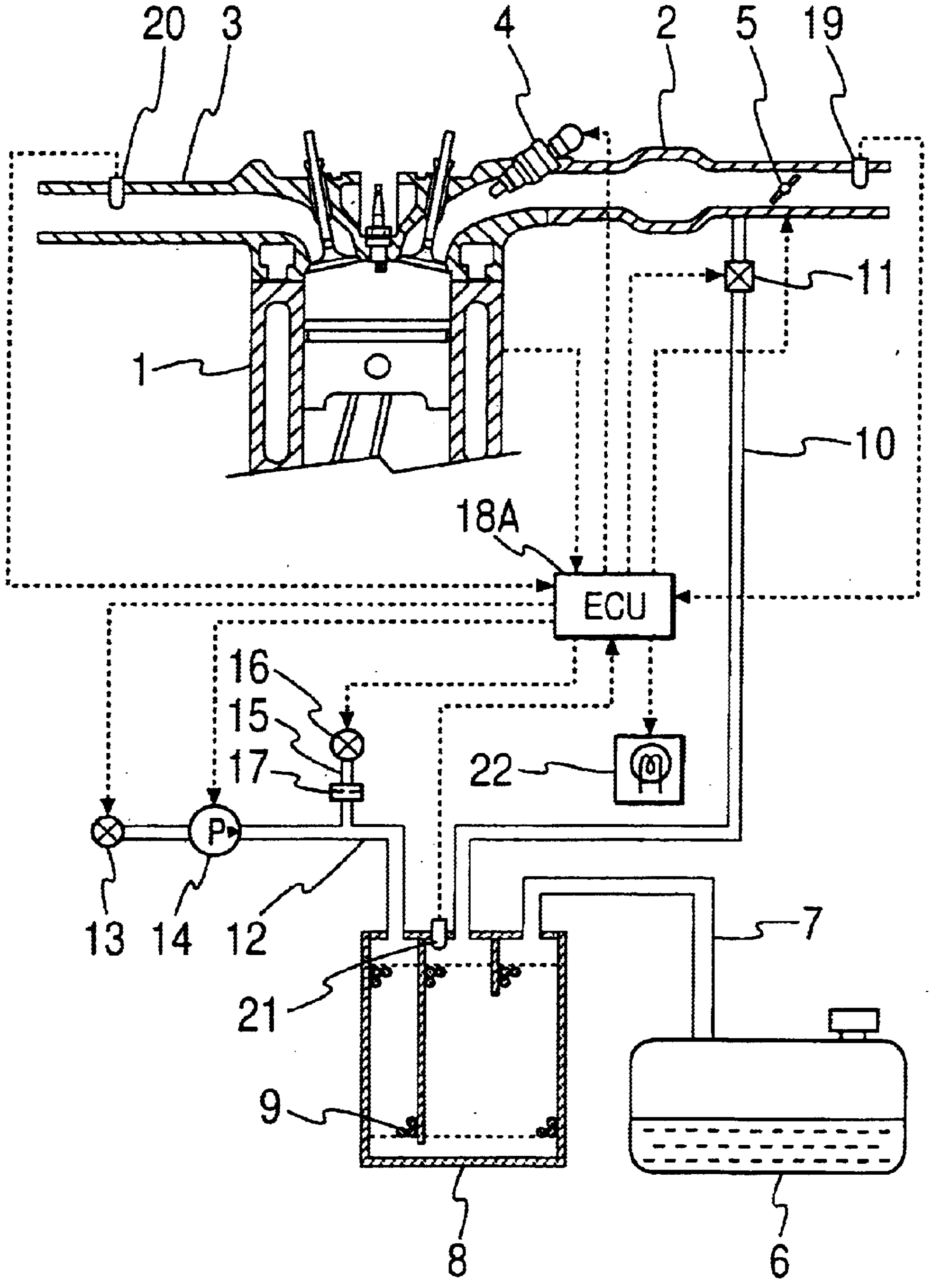
FIG. 6 is a block diagram showing the construction of an evaporated fuel treating unit in accordance with a second embodiment of the invention.

FIG. 6 is a block diagram showing the construction of an evaporated fuel treating unit in accordance with a second embodiment of the invention.

FIG. 7 is a flowchart in accordance with the second embodiment.

FIG. 8 is the flowchart in accordance with the second embodiment.

FIG. 9 is a timing chart in accordance with the second embodiment.

FIG. 10 is a block diagram showing the construction of an evaporated fuel treating unit in accordance with a third embodiment of the invention.

FIG. 11 is a flowchart in accordance with the third embodiment.

FIG. 12 is the flowchart in accordance with the third embodiment.

FIG. 13 is a timing chart in accordance with the second embodiment.

FIG. 14 is a block diagram showing the construction of an evaporated fuel treating unit in accordance with a fourth embodiment of the invention.

FIG. 15 is a flowchart in accordance with the fourth embodiment.

FIG. 16 is the flowchart in accordance with the fourth embodiment.

FIG. 17 is a timing chart in accordance with the fourth embodiment.

Figure 18:
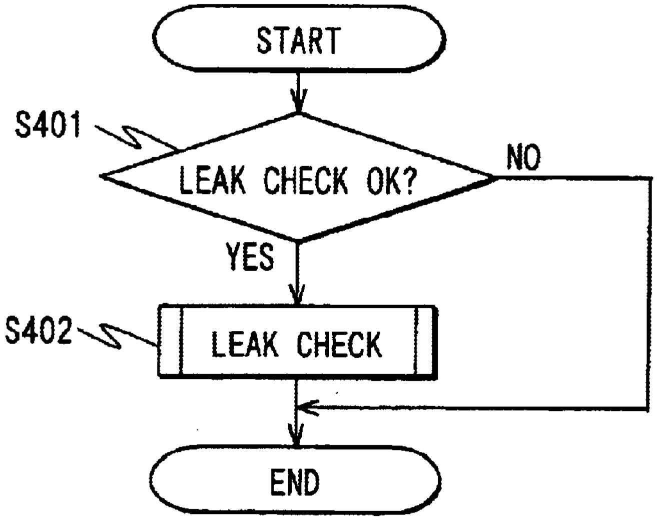
FIG. 18 is a flowchart in accordance with another embodiment of the invention.

FIG. 18 is a flowchart in accordance with another embodiment of the invention.

FIG. 19 is a timing chart showing a failure diagnosis technique according to a related art.

FIG. 20 is a timing chart showing a failure diagnosis technique according to a related art.

DETAILED DESCRIPTION OF THE PREFERRED EMBODIMENTS

First Embodiment

The construction of a failure diagnosis device of an evaporated fuel processing unit of a first embodiment of the present invention is shown in FIG. 1. In this embodiment, the invention is applied to an automobile mounted with an internal combustion engine (engine) 1. A fuel tank 6 of the engine 1 is connected to a canister 8 through an introduction passage 7 and always communicates with the canister 8. The canister 8 is filled with an absorbent 9 and fuel evaporated in the fuel tank 6 is temporarily absorbed by the absorbent 9. The canister 8 is connected to an intake pipe 2 of the engine 1 through a purge passage 10. The purge passage 10 is provided with a purge valve 11 that is a purge control valve and when the purge valve 11 is opened, the canister 8 is made to communicate with the intake pipe 2. A solenoid valve is used as the purge valve 11.

The purge valve 11 is controlled by an electronic control unit (hereinafter referred to as ECU) 18 for controlling parts of the engine 1. The ECU 18 has a basic construction used for a general engine. The ECU 18 controls such parts as an injector 4 that is mounted in the intake pipe 2 and injects fuel, a throttle 5 that adjusts the amount of intake air, and the like based on the amount of intake air by an air flow sensor 19 mounted in the intake pipe 2, a fuel-air ratio detected by a fuel-air ratio sensor 20 fixed to an exhaust pipe 3, an ignition signal, an engine speed, the temperature of engine cooling water, an accelerator position, and the like to provide a suitable amount of fuel injected and a suitable throttle opening. The opening of the purge valve 11 is controlled by a duty control or the like by the ECU 18 when the engine is operated. The purge valve 11 controls a flow rate of evaporated fuel in the purge passage 10. The evaporated fuel separated from the absorbent 9 is purged into the intake pipe 2 by a negative pressure and is burned with the fuel injected by the injector 4.

An atmosphere passage 12 opened to the atmosphere at its tip is connected to the canister 8. The atmosphere passage 12 is provided, in order closer to the tip side, with a closed valve 13 and a pump 14 that is means for increasing pressure. When the pump 14 is operated with the closed valve 13 opened, air from the atmosphere is pressurized and sent to the canister 8. When the closed valve 13 is closed, the atmosphere passage 12 is closed at the tip. A solenoid type two-way valve is used as the closed valve 13. Here, there is nothing wrong with reversing the placement of the closed valve 13 and the pump 14.

A base leak passage 15 that is a passage converging on the atmosphere passage 12 at a point closer to the canister 8 than the pump 14 is connected to the atmosphere passage 12. The base leak passage 15 is open to the atmosphere at the tip. The base leak passage 15 is provided, in order closer to the tip side, with a base leak valve 16 that is a valve and a base orifice 17 that is means for throttling the flow of air. The base orifice 17 is a fixed orifice having a determined passage area. When the base leak valve 16 is opened, gas can flow within a range throttled by the base orifice 17. When the base leak valve 16 is closed, the base leak passage 15 is closed at the tip side. A solenoid type two-way valve is used as the base leak valve 16. Here, there is nothing wrong with reversing the displacement of the base leak valve 16 and the base orifice 17.

The closed valve 13, the pump 14, the base leak valve 16 that have been described above, the foregoing purge valve 11, and the like are controlled by the ECU 18. When the purge valve 11, the closed valve 13, the base leak valve 16 are closed, a combined body (which is to be checked for leak and hereinafter referred to as an evaporation system) of the fuel tank 6, the introduction passage 7, the canister 8, the purge passage 10 and the atmosphere passage 12 and a leak passage 15 accompanying them forms a closed space forming body that forms a closed space. When the purge valve 11 is in a closed state, the evaporated fuel can be diffused in the evaporation system. Further, when the pump 14 is operated in a state where only the closed valve 13 is opened, it is possible to increase the pressure in the evaporation system and hence to produce a pressure difference between inside the evaporation system and outside the evaporation system that is in an atmospheric pressure.

Further, the canister 8 is provided with a pressure sensor 21 that is pressure detecting means for detecting the pressure in the canister 8 and the detection signal of the pressure sensor 21 is applied to the ECU 18 as a signal for leak check. The pressure sensor 21 detects the pressure in the evaporation system and a place where the pressure sensor 21 is fixed is not limited in the canister 8 but can be in a member constructing the evaporation system, for example, can be in the introduction passage 7 or the purge passage 10.

Alarm unit 22, e.g., an indicator, for giving a driver an alarm when an abnormality is found by a leak check is provided in a vehicle compartment. The alarm unit 22 is operated by the ECU 18.

Control conducted by the ECU 18 when the leak check is performed is shown in FIG. 2, FIG. 3, and FIG. 4. A failure diagnosis method and the operation of a failure diagnosis device in accordance with the invention will be described. Steps from S101 to S105 are procedures for determining whether a leak check is allowed or not and prevent the leak check from being conducted in a state where there might produce an error, in the determination of the leak check. First, it is determined at Step S101 whether conditions of the leak check are met or not. The conditions of the leak check are met when driving conditions, temperature conditions and the like satisfy predetermined conditions. When it is determined that the conditions of the leak check are met, the procedure proceeds to Step S102 and when it is determined that the conditions of the leak check are not met, the flow of procedures is finished. In this manner, for example, the leak check under high temperature is prevented.

Step S102 is a procedure as prohibition means where it is determined whether the engine is in a state of stop or not, that is, a key is turned off or not. When it is determined that the key is turned off, the procedure proceeds to Step S103 and when it is determined that the key is not turned off, the procedure waits until the key is turned off (Step S102). During the operation of the engine, temperature in the fuel tank 6 is increased by heat generated by a fuel pump and the like or fuel in the fuel tank 6 is shaken by the running state of a vehicle or road noises, so that the fuel is remarkably evaporated in some cases. The leak check is eliminated when the fuel is evaporated to vary the pressure in the evaporation system.

Step S103 to Step S105 are procedures for waiting for a predetermined time t0 set previously to elapse after the key is turned off and at Step S103, a timer t is reset (t=0) and at Step S104, the timer t is advanced by 1. Then, it is determined at Step S105 whether the timer t reaches t0 or not. When it is determined that the timer t reaches t0, the leak check is conducted at Step S106. When it is determined that the timer t does not reach t0, the procedure returns to Step S104 where the procedure waits for a predetermined time t0 to elapse. Since the state in the fuel tank 6 is not stabilized just after the key is turned off, the leak check is eliminated in a state where the state in the tank 6 is not stabilized.

The leak check (Step S106) will be described in detail. Operations of the respective valves 13, 16 and the pump 14 follow timing charts shown in FIG. 5.

Steps S200 to S212 are first measuring procedures as the first required time measuring means of the ECU 18. First, at Step S200, the purge valve 11 and the base leak valve 16 are closed to close the evaporation system at the purge valve 11 and the base leak valve 16 and the closed valve 13 is opened. Next, at Step S201, the pump 14 is turned on to increase the pressure in the evaporation system (t1). Here, the capacity (amount of discharge) of the pump 14 is set in such a way that even when a leak as large as a leak regulatory value occurs at any part in the evaporation system, the pressure in the evaporation system is increased. Pressure detected by the pressure sensor 21 is gradually increased.

Incidentally, as shown at Step S200 and S201, by closing the purge valve 11 and the base leak valve 16 before turning on the pump 14, it is possible to prevent the pressure from being dropped by the pump 14 being operated before the purge valve 11 and the base leak valve 16 are completely closed and hence to conduct the leak check with high efficiency. Needless to say, it is also recommended that the pump 14 be turned on at the same time when the purge 11 and the base leak valve 16 are closed, depending on the responsivity or the required specifications of the solenoid valve used as the purge valve 11 and the base leak valve 16.

Pressure P is measured at Step S202 and it is determined at the next Step S203 whether or not the measured pressure P is larger than a specified pressure P0 set previously. When it is determined that the measured pressure P is larger than the specified pressure P0, the procedure proceeds to Step S205 and when it is determined that the measured pressure P is not larger than the specified pressure P0, the procedure waits for the pressure P to increase (Step S202, S203). At this time, it is determined at Step S204 whether or not an elapsed time ta after the operation of the pump 4 is longer than a predetermined time ta1. Here, the predetermined time ta1 is a time to drive the pump 4 that is required for the pump 4 to increase the pressure in the evaporation system to the specified pressure P0 in a case where a leak corresponding to a base value occurs in the evaporation system. In a case where a very large leak occurs in the evaporation system, even if the pump 4 is operated for a sufficient time, the pressure in the evaporation system does not reach the specified pressure P0. For this reason, in a case where the elapsed time ta is longer than the predetermined time ta1 at Step S204, the procedure proceeds to Step S226 where it is determined that the leak of the evaporation system is abnormal.

When the pressure P is larger than the specified pressure P0, the closed valve 13 is closed at Step S205 and the pump 14 is turned off at Step S206. In this manner, the evaporation system is closed at the position of the closed valve 13 in addition to the positions the purge valve 11 and the base leak valve 16.

By closing the closed valve 13 before turning off the pump 14 as shown at Steps S205, S206, it is possible to prevent the pressure from being dropped by the pump 14 being turned off before the closed valve 13 is completely closed. Here, for the convenience of description, in FIG. 5, the pump 14 is turned off at the same time when the closed valve 13 is closed. Needless to say, it is also recommended that the pump 14 be turned off at the same time when the closed valve 13 is closed, depending on the responsivity and the required specifications of the solenoid valve used for the closed valve 13.

Next, the base leak valve 16 is opened at Step S207 (t2). In this manner, gas in the evaporation system pressurized to the specified pressure P0 passes through the base orifice 17 and flows out of the tip of the base leak passage 15. The base orifice 17 is a base leak hole the passage cross-sectional area of which is known. When the evaporation system has a leak hole as a failure, the gas flows out of the leak hole. This outflow of gas varies the pressure in the evaporation system. This state of change in the pressure is a state of decrease in the pressure where the pressure in the evaporation system decreases toward the pressure outside the evaporation system that is the atmospheric pressure.

When the base leak valve 16 is opened, a timer T1 is reset (T1=0) at Step S208.

The pressure P is measured at Step S209 and it is determined at the following Step S210 whether or not the measured pressure P is lower than the specified pressure P1 set previously. When it is determined that the measured pressure P is lower than the specified pressure P1, the procedure proceeds to Step S212. When it is determined that the measured pressure P is not lower than the specified pressure P1, at Step S211, the timer T1 is advanced (T1=T1+1) and the procedure returns to Step S209. That is, a required time is measured that is required for the pressure in the evaporation system to decrease from the first specified pressure P0 to the second specified pressure P1 lower than the first specified pressure P0.

When the pressure P reaches the second specified pressure P1 (t3), the required time T1 is stored in a memory at Step S212.

The following Step S213 to S223 are second measurement procedures and procedures as the second required time measuring means of the ECU 18. Like the procedures at from Steps S200 to S212, a time is determined that is required for the pressure in the evaporation system to decrease from the first specified pressure P0 to the second specified pressure P1 with the base leak valve 16 closed. That is, at Step S213, the base leak valve 16 is closed to close the evaporation system at the positions of the purge valve 11 and the base leak valve 16 and the closed valve 13 is opened. Then, at Step S214, the pump 14 is turned on to increase the pressure in the evaporation system.

In this respect, it is also recommended that also at Steps S213, S214, the pump 14 be turned on at the same time when the base leak valve 16 is closed.

At Step S215, the pressure P is measured and at the following Step S216, it is determined whether or not the measured pressure P is higher than the specified pressure P0 set previously. When it is determined that the measured pressure P is higher than the specified pressure P0, the procedure proceeds to Step S217 and when it is determined that the measured pressure P is not higher than the specified pressure P0, the procedure waits for the pressure P to increase (Step S215, S216).

When the pressure P is higher than the specified pressure P0, the closed valve 13 is closed at Step S217 and the pump 14 is turned off at Step S218 (t4). In this manner, the evaporation system is closed at the position of the closed valve 13 in addition of the positions of the purge valve 11 and the base leak valve 16.

In this respect, it is also recommended that also at Steps S217, S218, the pump 14 be turned on at the same time when the closed valve 13 is closed.

In the evaporation system after this t4, the base leak valve 16 is closed, which is different from a state during a period from t2 to t3, and hence the gas in the evaporation system pressurized to the specified pressure P0 flows out of only the leak hole as a failure to reduce the pressure in the evaporation system. Here, in a period after t4 and in a period from t2 to t3, the amount of remaining fuel is equal to each other and hence the volume of a space to be pressurized in the evaporation system is also equal and an atmospheric temperature is also substantially equal to each other. Needless to say, the property of the fuel is also equal. Thus, the states in both the periods are assumed to be equivalent except that they are different in a portion where a gas leak occurs.

When the pump 14 is turned off, the timer T2 is reset at Step S219 (T2=0).

At Step S220, the pressure P is measured and at the following Step S221, it is determined whether or not the measured pressure P is lower than the specified pressure P1. When it is determined that the measured pressure P is lower than the specified pressure P1, the procedure proceeds to Step S223, and when it is determined that the measured pressure P is not lower than the specified pressure P1, the timer T2 is advanced (T2=T2+1) at Step S222 and the procedure returns to Step S220. That is, a time is measured that is required for the pressure P in the evaporation system to decrease from the first specified pressure P0 to the second specified pressure P1.

When the pressure P reaches the second specified pressure P1 (t5), the required time T2 is stored in a memory at Step S223.

At the following Steps S224 to S227, it is determined whether a leak occurs in the evaporation system. This is a procedure as the determination means of the ECU 18.

Here, before the description of a determination procedure, a determination principle will be described. In a case where gas leaks from the evaporation system, as is known from the Bernoulli's theorem expressed by an equation (1), if the pressure in the evaporation system is equal, the velocity of flow of leaking gas is equal at any leak point regardless of the area A of the leak point. In the following equation (1), v is the velocity of flow, P is pressure, ρ is density, g is gravity, and z is position in a vertical direction.

$$V^2/2+P/\rho+gz=\text{constant} - - - \quad (1)$$

Therefore, under the same pressure, the flow rate of the leaking gas Q (=v×A) is proportional to the area A of the leak point. If the area A doubles, the flow rate of the leaking gas Q also doubles and hence the rate of decrease in the pressure caused by the leak also doubles. In other words, in a case where a leak hole is formed in a substantially closed space, if the area A of the leak hole doubles, a time becomes one half that is required for the pressure to decrease from the same initial pressure by the same pressure difference ΔP.

In this embodiment, the area of the leak hole is determined by using the above principle. First, a case is assumed in which a leak hole equal to the base orifice 17 is formed in the evaporation system by a failure. In this case, the total of area of the leak holes when the base leak valve 16 is closed is one half of the total area of the leak holes when the base leak hole 16 is opened. For this reason, the required time T2 is two times the required time T1. That is, T2=T1×2. The required time T2 is a time required for the pressure P to decrease to the second specified pressure P1 when the base leak valve 16 is closed. The required time T1 is a time required for the pressure P to decrease to the second specified pressure P1 when the base leak valve 16 is opened.

Next, a case is assumed in which the leak hole larger than the base orifice 17 is formed in the evaporation system by a failure. In this case, the total area of the leak holes when the base leak valve 16 is closed is large than one half of the total area of the leak holes when the base leak hole 16 is opened. For this reason, the required time T2 is smaller than two times the required time T1. That is, T2<T1×2.

Further, a case is assumed in which the leak hole smaller than the base orifice 17 is formed in the evaporation system by a failure. In this case, the total area of the leak holes when the base leak valve 16 is closed is smaller than one half of the total area of the leak holes when the base leak hole is opened. For this reason, the required time T2 is larger than two times the required time T1. That is, T2 >T1××2.

Therefore, at Step S224, the required time T2 is compared with a determination base time (T1×2) obtained by multiplying the required time T1 by a coefficient 2 and it is determined whether or not T2>T1×2. That is, by comparing the required time T2 with the determination time T1×2, it is determined whether or not the area of the leak hole as a failure is larger than the passage cross-sectional area of the base orifice 17. When it is determined that the area of the leak hole as a failure is larger than the passage cross-sectional area of the base orifice 17, it is determined that the leak is little and the procedure proceeds to Step S225 where the leak of the evaporation system is diagnosed as being normal to finish the leak check. When it is determined at Step S224 that the area of the leak hole as a failure is not larger than the passage cross-sectional area of the base orifice 17, it is determined that the leak is much and the procedure proceeds to Step S226 where the leak of the evaporation system is diagnosed as being abnormal. Then, at Step S227, the alarm unit 22 is operated to finish the leak check.

In a case of the first measurement where the leak occurs at the base orifice 17 and in a case of the second measurement where the leak does not occur at the base orifice 17, the evaporation system is substantially equal in the mount of remaining fuel and the atmospheric temperature and hence the amount of remaining fuel and the atmospheric temperature do not produce effects. Thus, it is not necessary to make a correction based on these factors. Further, since the pump 14 stops increasing the pressure in the evaporation system at the specified pressure P0, it is not necessary to use the pump 14 having a high discharge capacity. Still further, this shortens the operating time of the pump 14, reduces load applied to the pump 14, and hence elongates the life of the pump 14. Thus, this reduces power consumption and hence saves energy.

Further, in both cases of measurements, along with the initial pressure, the final pressure is the specified pressure P1 set previously, so that even when the amount of remaining fuel is large and the volume to be pressurized is small, the effects produced by these factors are only to shorten the required times T1 and T2 that are required for the pressure to decrease from the first specified pressure P0 to the second specified pressure P1. Therefore, it is possible to always determine the state of the leak correctly. This can greatly relax conditions allowing the proper leak check and hence increase the frequency of determinations.

Here, while the determination base time is obtained by multiplying T1 by a coefficient of 2, the coefficient is not always limited to 2 but can be 3, for example. In this case, an upper limit value (determination base value) allowed as the area of the leak hole as a failure becomes one half of the passage cross-sectional area of the base orifice 17, and when the leak hole as a failure equal to the determination base value is formed in the evaporation system, the required time T2 becomes equal to the determination base time (T1×3). This is because the ratio of the area of the leak hole at the time of the first measurement to the area of the leak hole at the time of the second measurement becomes 3.

In general, the following equations hold. Assuming that the passage cross-sectional area of the base orifice 17 is A0 and the area of the leak hole as a failure AL, the equations (2) and (3) hold.

$$1/T1:1/T2=(A0+AL):AL \quad (2)$$

$$T2/T1=(A0+AL)/AL \quad (3)$$

Thus, when the upper limit (determination base value) allowed as the area AL of the leak hole as a failure is expressed by αA0 by using the passage cross-sectional area A0 of the base orifice 17 as a unit and the area of the leak hole as a failure is the determination base value αA0, the following equation (4) is obtained from the equation (3). Thus, a coefficient by which the required time T1 is multiplied when the determination base time is set becomes (1+α)/α.

$$T2/T1=(1+\alpha)/\alpha \quad (4)$$

Thus, a case where the required time T2 is compared with the required time T1×2 is an example in which α=1, and a case where the required time T2 is compared with the required time T1×3 is an example in which α=½.

As described above, by setting the coefficient by which the required time T1 is multiplied when the determination base time is found based on the determination base value obtained by using the passage cross-sectional area of the base orifice 17 as a unit, it is possible to grasp the size of the leak hole as a failure by the magnitude of the coefficient (1+α)/α and a comparison in magnitude between the required time T2 and the determination base time (T1×(1+α)/α).

Then, by setting the coefficient (1+α)/α at the ratio of the area (A0+AL) of the leak points at the time of the first measurement to the area AL of the leak point at the time of the second measurement at the time when the area AL of the leak hole as a failure is the allowable upper limit value αA0, it is possible to determine whether or not the area AL of the leak hole as a failure is smaller than the allowable upper limit value αA0 by the comparison in magnitude between the foregoing required time T2 and the determination base time (T1×(1+α)/α). Thus, it is possible to set the determination base value regardless of the size of the base orifice 17.

Second Embodiment

A second embodiment of the invention will be described based on from FIG. 6 to FIG. 9. The second embodiment adopts the construction shown in FIG. 6. The components described in the foregoing embodiment are denoted by the same reference symbols and descriptions will be focused on differences between the second embodiment and the foregoing embodiment.

The procedures of the leak check performed by the ECU 18A are shown in FIG. 7 and FIG. 8. FIG. 9 shows the waveforms of respective parts at the time of the leak check. Steps from S300 to S319 are equal to Steps from S200 to S219.

The following Steps from S313 to S319 and from S322 to S324 are second measurement procedures and construct means for measuring a pressure reached of the ECU 18A.

Of the following Steps from S320 to S326, at Steps S320, S321, S323, A325, and S326, it is determined whether or not leak occurs in the evaporation system. These are procedures as the determination means of the ECU 18A. At Step S320, T2 is compared with T1×2 and it is determined whether or not T2 is larger than T1×2. When it is determined that T2 is larger than T1×2, the procedure proceeds to Step S321 and when it is determined that T2 is not larger than T1×2, the procedure proceeds to Step S322. The procedure proceeds to Step S322 immediately after t4 when the timer T2 is reset. The Step S321 will be described later.

At Step S322, the pressure P is measured and at the following Step S323, it is determined whether or not the measured pressure P is lower than the foregoing specified pressure P1. When it is determined that the measured pressure P is lower than the foregoing specified pressure P1, the procedure proceeds to Step S325 and when it is determined that the measured pressure P is not lower than the foregoing specified pressure P1, the procedure proceeds to Step S324. The procedure proceeds to Step S324 just after t4 when the time T2 is reset.

At Step S324, the timer T2 is advanced (T2=T2+1). Then, the procedure returns to Step S320. That is, while it is being monitored after t4 whether or not the time T2 that elapses after the pressure P in the evaporation system becomes the specified pressure P0 and then the pump 14 is turned off is larger than the determination base time T1×2 (Step S320) and whether or not the pressure P is lower than the foregoing specified pressure P1 (Step S322), the pressure decreases from the first specified pressure P0 to the second specified pressure P1.

In this embodiment, the area of the leak hole is determined by using the above principle. First, a case is assumed in which the leak hole equal to the base orifice 17 is formed in the evaporation system by a failure. In this case, the total of area of the leak holes when the base leak valve 16 is closed is one half of the total area of the leak holes when the base leak hole 16 is opened. For this reason, the required time T2 is two times the required time T1. That is, T2=T1×2. The required time T2 is a time required for the pressure P to decrease to the second specified pressure P1 when the base leak valve 16 is closed. The required time T1 is a time required for the pressure P to decrease to the second specified pressure P1 when the base leak valve 16 is opened. The pressure reached P' when the required time T2 reaches the determination base time T1×2 is the foregoing specified pressure P1.

Next, a case is assumed in which the leak hole larger than the base orifice 17 is formed in the evaporation system by a failure. In this case, the total of area of the leak holes when the base leak valve 16 is closed is large than one half of the total area of the leak holes when the base leak hole 16 is opened. For this reason, the required time T2 is smaller than two times the required time T1. That is, T2<T1×2. Thus, the pressure becomes smaller than the specified pressure P1 before the time T2 reaches the determination base time T1×2. That the pressure becomes smaller than the specified pressure P1 before the time T2 reaches the determination base time T1×2 is equivalent to that the pressure reached P' when the determination base time T1×2 elapses becomes smaller than the specified pressure P1.

Further, a case is assumed in which the leak hole smaller than the base orifice 17 is formed in the evaporation system by a failure. In this case, the total of area of the leak holes when the base leak valve 16 is closed is smaller than one half of the total area of the leak holes when the base leak hole is opened. For this reason, the required time T2 is larger than two times the required time T1. That is, T2>T1×2. Thus, even when the required time T2 becomes the determination base time T1×2, the pressure P does not reach the specified pressure P1. The pressure reached P' when the determination base time T1×2 elapses is larger than the specified pressure P1.

Thus, when it is determined earlier at Step S320 that the lapsed time T2 is larger than the determination base time T1×2, it is determined that the leak is little and the procedure proceeds from Step S320 to Step S321 where the leak of the evaporation system is diagnosed as being normal and then the leak check is finished. On the other hand, when it is determined earlier at Step S323 that the pressure P is lower than the specified pressure P1, it is determined that the leak is much and the procedure proceeds from Step S323 to Step S325 where the leak of the evaporation system is diagnosed as being abnormal. Then, at the following Step S326, the alarm unit 22 is operated and then the leak check is finished.

Also in this embodiment, in a case of the first measurement where leak occurs at the base orifice 17 and in a case of the second measurement where the leak does not occur at the base orifice 17, the evaporation system is substantially equal in the amount of remaining fuel (the volume of the space) and the atmospheric temperature, and hence the amount of remaining fuel and the atmospheric temperature do not produce effects. Thus, it is not necessary to make a correction based on these factors. Further, since the pump 14 stops increasing the pressure at the specified pressure P0, it is not necessary to use the pump 14 having a high discharge capacity. Still further, this shortens the operation time of the pump 14 and reduces load applied to the pump 14 and hence elongates the life of the pump 14. Thus, this reduces power consumption and saves energy.

In contrast to the first embodiment in which it is determined whether the leak is much or little by the length of time required for the pressure P to decrease from the specified pressure P0 to the specified pressure P1, in this embodiment, it is determined whether the leak is much or little by the determination as to which of the time when the lapsed time T2 becomes larger than the determination base time T1×2 and the time when the pressure P becomes lower than the specified pressure P1 comes earlier, so that after the determination base time T1×2 is reached, it is not necessary to measure the state of decrease in the pressure P. Thus, it is possible to perform the leak check within a short time.

Here, while the determination base time is obtained by multiplying T1 by a coefficient of 2, the coefficient is not always limited to 2 but can be 3, for example. In this case, an upper limit value (determination base value) allowed as the area of the leak hole as a failure is one half of the passage cross-sectional area of the base orifice 17, and when a leak equal to the determination base value occurs in the evaporation system, a pressure reached P' at the time when the determination base time T1×3 elapses becomes equal to the specified pressure P1. This is because the ratio of the area of the leak points at the time of the first measurement to the area of the leak point at the time of the second measurement is 3.

Further, by setting the coefficient by which the required time T1 is multiplied when the determination base time is found based on the determination base value obtained by using the passage cross-sectional area of the base orifice 17 as a unit, it is possible to grasp the size of the leak hole as a failure by the magnitude of the coefficient and the comparison in magnitude between the pressure reached P' and the second specified pressure P1.

Then, by setting the coefficient by which the required time T1 is multiplied at the ratio of the area of the leak points at the time of the first measurement to the area of the leak point at the time of the second measurement at the time when the area of the leak hole as a failure is the allowable upper limit value, it is possible to determine whether or not the area of the leak hole as a failure is smaller than the allowable upper limit value by the comparison in magnitude between the pressure reached P' and the second specified pressure P1. Thus, it is possible to set the determination base value regardless of the size of the base orifice 17.

Third Embodiment

In a third embodiment of the invention, a pressure difference is produced between inside the evaporation system and outside the evaporation system by reducing the pressure in the evaporation system. The evaporated fuel treating unit of the third embodiment is shown in FIG. 10. The components described in the foregoing embodiments are denoted by the same reference symbols and descriptions will be focused on differences between the third embodiment and the foregoing embodiments.

The atmosphere passage 12 is provided with a pump 14A in place of the pump 14 in the first embodiment. The pump 14A is a motor-driven pump operated by the control of the ECU 18B. When the pump 14A is operated with the closed valve 13 opened, in contrast to the pump 14, it presses and discharges air from the canister 8 to the atmosphere. This reduces the pressure in the evaporation system and produces a pressure difference between inside the evaporation system and outside the evaporation system that is in the atmospheric pressure.

The procedures of the leak check performed by the ECU 18B are shown in FIG. 11 and FIG. 12. FIG. 13 shows the waveforms of parts in the leak check.

Steps from S200 to S212 are first measurement procedures. This is the first required time measuring means of the ECU 18B. These steps are nearly equal to those in the first embodiment. When the pump 14A is turned on (Step S201A), the pressure in the evaporation system starts to decrease. When the pressure reaches the first specified pressure P0 (Step S203A), the pump 14A is turned off (Step S206A). Here, the first specified pressure P0 is a pressure value set on a negative side. The second specified pressure P1 that will be described later is the same.

At Steps from S207 to S212, the state of change in pressure in a state where the base leak valve 16 is opened (Step S207) is measured. As to the state of change in pressure in this state, the pressure P in the evaporation system is negative and hence air flows into the evaporation system through the leak hole of the evaporation system and increases the pressure P toward the atmospheric pressure.

When the pressure P increases toward the second specified pressure P1 set previously closer to the atmospheric pressure and it is determined that P>P1 (Step S210A), a time required for the pressure P to increase from the first specified pressure P to the second specified pressure P1 is stored as a first required time T1 (Step S212).

Steps from S213 to S223 are second measurement procedures. This is the second required time measuring means of the ECU 18B. These steps are nearly equal to those in the first embodiment. When the pump 14A is turned on (Step S214A), the pressure in the evaporation system starts to decrease. When the pressure reaches the first specified pressure P0 (Step S216A), the pump 14A is turned off (Step S218A).

Then, at Steps from S217 to S223, the state of change in pressure in a state where the base leak valve 16 is closed (Step S217) is measured.

When the pressure P increases toward the second specified pressure P1 and it is determined that P>P1 (Step S221A), a time required for the pressure P to increase from the first specified pressure P0 to the second specified pressure P1 is stored as a second required time T2 (Step S212).

Steps from S224 to S227 are also performed in the same way as in the first embodiment and a determination as to whether a leak is caused or not is made.

Also in the third embodiment, as in the first embodiment, the Bernoulli's theorem holds true and hence the same determination principle is viable. Thus, by setting the coefficient by which the first required time T1 is multiplied when the determination base time is found based on the determination base value obtained by using the passage cross-sectional area of the base orifice 17 as a unit, it is possible to grasp the size of the leak hole as a failure by the magnitude of the coefficient and the comparison in magnitude between the second required time T2 and the determination base time. In this embodiment, air flows from outside the evaporation system into the evaporation system, so that even if a leak might occur in the evaporation system, the evaporated fuel is not discharged from the leak hole to the outside of the evaporation system when the leak check is performed.

Then, by setting the coefficient by which the required time T1 is multiplied at the ratio of the area of the leak hole at the time of the first measurement to the area of the leak hole at the time of the second measurement at the time when the area of the leak hole as a failure is the allowable upper limit value, it is possible to determine whether or not the area of the leak hole as a failure is smaller than the allowable upper limit value by the comparison in magnitude between the required time T2 and the determination base time. Thus, it is possible to set the determination base value regardless of the size of the base orifice 17.

Fourth Embodiment

The evaporated fuel treating unit of a fourth embodiment is shown in FIG. 14. The fourth embodiment is a combination of the second embodiment and the third embodiment. The components described in the foregoing embodiments are denoted by the same reference symbols and descriptions will be focused on the difference between the fourth embodiment and the foregoing embodiments.

The procedures of the leak check performed by the ECU 18C are shown in FIG. 15 and FIG. 16. FIG. 17 shows the waveforms of parts in the leak check.

Steps from S300 to S312 are first measurement procedures. This is the required time measuring means of the ECU 18C. When the pump 14A is turned on (Step S301A), the pressure P in the evaporation system starts to decrease. When the pressure P reaches the first specified pressure P0 (Step S303A), the pump 14A is turned off (Step S306A).

At Steps from S307 to S312, the state of change in the pressure in a state where the base leak valve 16 is opened (Step S307) is measured.

When the pressure P increases toward the second specified pressure P1 set previously closer to the atmospheric pressure and it is determined that P>P1 (Step S310A), a time required for the pressure P to increase from the first specified pressure P0 to the second specified pressure P1 is stored as a required time T1 (Step S312).

Steps from S313 to S323 are second measurement procedures. This is means for measuring pressure reached of the ECU 18C. First, when the pump 14A is turned on (Step S314A), the pressure P in the evaporation system starts to decrease. When the pressure P reaches the first specified pressure P0 (Step S316A), the pump 14A is turned off (Step S318A).

Then, at Steps from S317 to S323, the state of change in the pressure in a state where the base leak valve 16 is closed (Step S317) is measured.

Then, at Step S323A, it is determined whether or not the pressure P in the evaporation system is larger than the second specified pressure P1, that is, P>P1 until the elapsed time T2 reaches the determination base time T1×2, and when it is determined that the pressure P in the evaporation system is larger than the second specified pressure P1, at Step S325, the leak of the evaporation system is diagnosed as being abnormal. When the elapsed time T2 reaches the determination base time T1×2 before the pressure P becomes larger than the second specified pressure P1 (Step S320), at Step S321, the leak of the evaporation system is diagnosed as being normal.

Also in the fourth embodiment, as in the second embodiment, the Bernoulli's theorem holds true and hence the same determination principle is viable. Thus, by setting the coefficient by which the required time T1 is multiplied when the determination base time is found based on the determination base value obtained by using the passage cross-sectional area of the base orifice 17 as a unit, it is possible to grasp the size of the leak hole as a failure by the magnitude of the coefficient and the comparison in magnitude between the pressure reached P' and the second specified pressure P1. In this embodiment, air flows from outside the evaporation system into the evaporation system, so that even if a leak might occur in the evaporation system, the evaporated fuel is not discharged from the leak hole to the outside of the evaporation system when the leak check is performed.

Then, by setting the coefficient by which the required time T1 is multiplied at the ratio of the area of the leak hole at the time of the first measurement to the area of the leak hole at the time of the second measurement at the time when the area of the leak hole as a failure is the allowable upper limit value, it is possible to determine whether or not the area of the leak hole as a failure is smaller than the allowable upper limit value by the comparison in magnitude between the pressure reached P' and the second specified pressure P1. Thus, it is possible to set the determination base value regardless of the size of the base orifice 17.

Here, in the foregoing respective embodiments, the leak check is performed only when the engine is stopped, but it is also recommended that the leak check be performed during the operation of the engine. In this case, it is recommendable to perform the control shown in FIG. 18 in place of the control shown in FIG. 2. That is, when the leak check conditions are met at Step S401, the leak check is immediately performed at Step S402 in the same way as in the foregoing respective embodiments.

Further, in the foregoing respective embodiments, it is determined whether the state of leak of the evaporation system is normal or abnormal, that is, the state of leak of the evaporation system is determined by two steps. However, it is also recommendable to determine the state of leak of the evaporation system by a plurality of steps based on the ratio of the required time T2 in the first and third embodiments to the determination base time T1×2 or the ratio of the pressure reached P' in the second and fourth embodiments to the specified pressure P1. Further, it is also recommended that in the first and third embodiments, a plurality of times obtained by multiplying the first required time T1 by a plurality of coefficients be set as a plurality of determination base times and a determination on the comparison between the second required time and the determination base time be performed for the respective determination base times (Step S224) and the degree of the leak be determined with higher accuracy by the value of the foregoing determination base time when the result of determination is reversed. Still further, it is also recommended that in the second and fourth embodiments, a plurality of times obtained by multiplying the required time T1 by a plurality of coefficients be set as a plurality of determination base times and a determination on the comparison between the pressure reached and the second specified pressure for the respective determination base times (Step S323) and the degree of the leak be determined with higher accuracy by the value of the foregoing determination base time when the result of determination is reversed.

Further, according to the specifications required, in place of the motor-driven pumps 14, 14A, it is possible to use a pump driven by the power of an engine.

Moreover, the specific specifications of the invention can be modified within the spirit and scope of the invention in addition to those described specifically.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A failure diagnosis method for diagnosing an evaporated fuel treating unit provided with a canister receiving an absorbent for absorbing evaporated fuel, a purge passage for introducing the evaporated fuel separated from the absorbent into an intake pipe of an internal combustion engine, and a purge control valve for controlling a flow rate of the evaporated fuel in the purge passage, the method comprising the steps of:

producing a pressure difference between inside an evaporation system including a fuel tank, the canister, the purge passage and the purge control valve and outside the evaporation system;

measuring a state of change in pressure in the evaporation system; and determining a state of leak in the evaporation system based on the measured state of change in pressure, wherein the step of measuring the state of change in pressure comprises:

a first measuring step comprising the steps of:

making a pressure in the evaporation system a first specified pressure;

opening a base leak hole; and measuring a required time that is required for the pressure in the evaporation system to change from the first specified pressure to a second specified pressure set at a value closer to a pressure outside the evaporation system than the first specified pressure, and a second measuring step comprising the steps of:

making the pressure in the evaporation system the first specified pressure;

closing the base leak hole; and measuring a pressure reached in the evaporation system when a determination base time obtained by multiplying the required time by a coefficient set previously based on an area of the base leak hole, and wherein the step of determining the state of leak in the evaporation system is performed by comparing the pressure reached with the second specified pressure.

2. The failure diagnosis method for diagnosing an evaporated fuel treating unit as claimed in claim 1, the coefficient is set at a ratio of a total area of a leak point at the first measuring step that includes the base leak hole and a leak hole as a failure to an area of the leak point at the second measuring step that includes only the leak hole as a failure at the time when an area of the leak hole as a failure is an allowable limit value.

3. The failure diagnosis method for diagnosing an evaporated fuel treating unit as claimed in claim 1, wherein the pressure difference is produced by increasing the pressure in the evaporation system and the state of change in pressure is a state of decrease in pressure.

4. The failure diagnosis method for diagnosing an evaporated fuel treating unit as claimed in claim 1, wherein the pressure difference is produced by decreasing the pressure in the evaporation system and the state of change in pressure is a state of increase in pressure.

5. A failure diagnosis device for diagnosing an evaporated fuel treating unit provided with a canister receiving an absorbent for absorbing evaporated fuel, a purge passage for introducing the evaporated fuel separated from the absorbent into an intake pipe of an internal combustion engine, and a purge control valve for controlling a flow rate of the evaporated fuel in the purge passage, the device comprising:

pressure difference producing means for producing a pressure difference between inside an evaporation system including a fuel tank, the canister, the purge passage and the purge control valve and outside the evaporation system;

pressure detecting means for detecting a pressure in the evaporation system; a passage for making the evaporation system communicate with an atmosphere;

throttling means mounted in the passage and having a certain passage cross-sectional area;

a valve for closing the passage;

required time measuring means that controls the pressure difference producing means and the valve to make the pressure in the evaporation system a first specified pressure set previously, then opens the valve, and measures a required time that is required for the pressure in the evaporation system to change from the first specified pressure to a second specified pressure set at a value closer to a pressure outside the evaporation system than the first specified pressure;

pressure reached measuring means that controls the pressure difference producing means to make the pressure in the evaporation system the first specified pressure, then closes the valve, and measures a pressure reached in the evaporation system when a determination base time elapses that is obtained by multiplying the required time by a coefficient set previously based on a passage cross-sectional area of the throttle means; and determination means that determines a state of leak of the evaporation system by comparing the pressure reached with the second specified pressure.

6. The failure diagnosis method for diagnosing an evaporated fuel treating unit as claimed in claim 5, the coefficient is set at a ratio of a total area of a leak point when the required time is measured that includes the throttle means and a leak hole as a failure to an area of a leak point when the pressure reached is measured that includes only the leak hole as a failure at the time when the leak hole as a failure is an allowable limit value.

7. The failure diagnosis device for diagnosing an evaporated fuel treating unit as claimed in claim 5, wherein the pressure difference producing means is means for increasing the pressure in the evaporation system and the state of change in pressure is a state of decrease in pressure.

8. The failure diagnosis device for diagnosing an evaporated fuel treating unit as claimed in claim 5, wherein the pressure difference producing means is means for decreasing the pressure in the evaporation system and the state of change in pressure is a state of increase in pressure.

9. The failure diagnosis device for diagnosing an evaporated fuel treating unit as claimed in claim 5, wherein the pressure difference producing means is constructed by a motor-driven pump.

10. The failure diagnosis device for diagnosing an evaporated fuel treating unit as claimed in claim 9, further comprising prohibition means that determines whether or not the internal combustion engine is in a state of operation and when it is in the state of operation, prohibits operations of the required time measuring means and the pressure reached measuring means.

* * * * *